US012573010B2

(12) United States Patent
Iwashita et al.

(10) Patent No.: US 12,573,010 B2
(45) Date of Patent: Mar. 10, 2026

(54) IMAGE PROCESSING APPARATUS, RADIATION IMAGING SYSTEM, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Atsushi Iwashita, Tokyo (JP); Kosuke Terui, Kanagawa (JP); Ryuichi Fujimoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 379 days.

(21) Appl. No.: 18/306,339

(22) Filed: Apr. 25, 2023

(65) Prior Publication Data

US 2023/0401677 A1    Dec. 14, 2023

(30) Foreign Application Priority Data

Jun. 13, 2022    (JP) ................................. 2022-095223

(51) Int. Cl.
*G06T 5/70*        (2024.01)
*G06T 5/20*        (2006.01)
                (Continued)

(52) U.S. Cl.
CPC .................. *G06T 5/70* (2024.01); *G06T 5/20* (2013.01); *G06T 5/50* (2013.01); *G06T 7/13* (2017.01);
                (Continued)

(58) Field of Classification Search
CPC .... G06T 5/70; G06T 5/20; G06T 5/50; G06T 7/13; G06T 7/60; G06T 2207/10116;
                (Continued)

(56) References Cited

U.S. PATENT DOCUMENTS 9,035,265 B2    5/2015    Yagi
9,239,390 B2    1/2016    Sato
                (Continued)

FOREIGN PATENT DOCUMENTS

JP        2019-162358 A        9/2019

*Primary Examiner* — Edward Park
*Assistant Examiner* — Alexander Joseph Vaughn
(74) *Attorney, Agent, or Firm* — Carter, DeLuca & Farrell LLP

(57)        ABSTRACT

An image processing apparatus includes: a processing unit configured to perform noise reduction processing and material decomposition processing using a plurality of images corresponding to a plurality of different radiation energies obtained by irradiating an object with radiation and performing imaging. The processing unit generates a noise reduction image by applying filter processing for each frequency component obtained by resolving a thickness image of a material obtained by the material decomposition processing into a plurality of frequencies, and generates an image by material re-decomposition processing using the thickness image after noise reduction, which is obtained by combining the noise reduction images for each frequency component and an accumulation image obtained based on combining of the plurality of images.

16 Claims, 13 Drawing Sheets

(51) Int. Cl.
    *G06T 5/50*      (2006.01)
    *G06T 7/13*      (2017.01)
    *G06T 7/60*      (2017.01)

(52) U.S. Cl.
    CPC ...... *G06T 7/60* (2013.01); *G06T 2207/10116*
    (2013.01); *G06T 2207/20028* (2013.01); *G06T*
    *2207/20192* (2013.01); *G06T 2207/20224*
    (2013.01); *G06T 2207/30008* (2013.01)

(58) Field of Classification Search
    CPC . G06T 2207/20028; G06T 2207/20192; G06T
    2207/20224; G06T 2207/30008; G06T
    2200/28; G06T 5/10; A61B 6/481; A61B
    6/482; A61B 6/505; A61B 6/5258; H04N
    25/30; H04N 25/59; H04N 25/616; H04N
    25/771
    See application file for complete search history.

(56)                 References Cited

U.S. PATENT DOCUMENTS 9,360,562  B2    6/2016  Sato
    9,417,333  B2    8/2016  Sato

| | | | |
|---|---|---|---|
| 9,910,169 | B2 | 3/2018 | Iwashita |
| 10,234,574 | B2 | 3/2019 | Iwashita |
| 11,422,098 | B2 | 8/2022 | Iwashita |
| 2009/0052612 | A1* | 2/2009 | Wu ........................ G06T 11/008 |
| | | | 378/5 |
| 2011/0216986 | A1* | 9/2011 | Stowasser ................ H04N 5/32 |
| | | | 382/260 |
| 2013/0051697 | A1* | 2/2013 | Takahashi ................. G06T 5/70 |
| | | | 382/265 |
| 2014/0320685 | A1 | 10/2014 | Takenaka |
| 2015/0269724 | A1* | 9/2015 | Kobayashi ............. A61B 6/032 |
| | | | 382/131 |
| 2016/0019432 | A1* | 1/2016 | Fredenberg ............... G06T 7/60 |
| | | | 382/131 |
| 2018/0204306 | A1* | 7/2018 | Brendel .................... G06T 5/50 |
| 2020/0408933 | A1 | 12/2020 | Iwashita |
| 2022/0365004 | A1 | 11/2022 | Iwashita |
| 2023/0153970 | A1 | 5/2023 | Iwashita |
| 2023/0263492 | A1 | 8/2023 | Yamazoe |
| 2023/0404505 | A1 | 12/2023 | Fujimoto |

* cited by examiner

F I G. 1
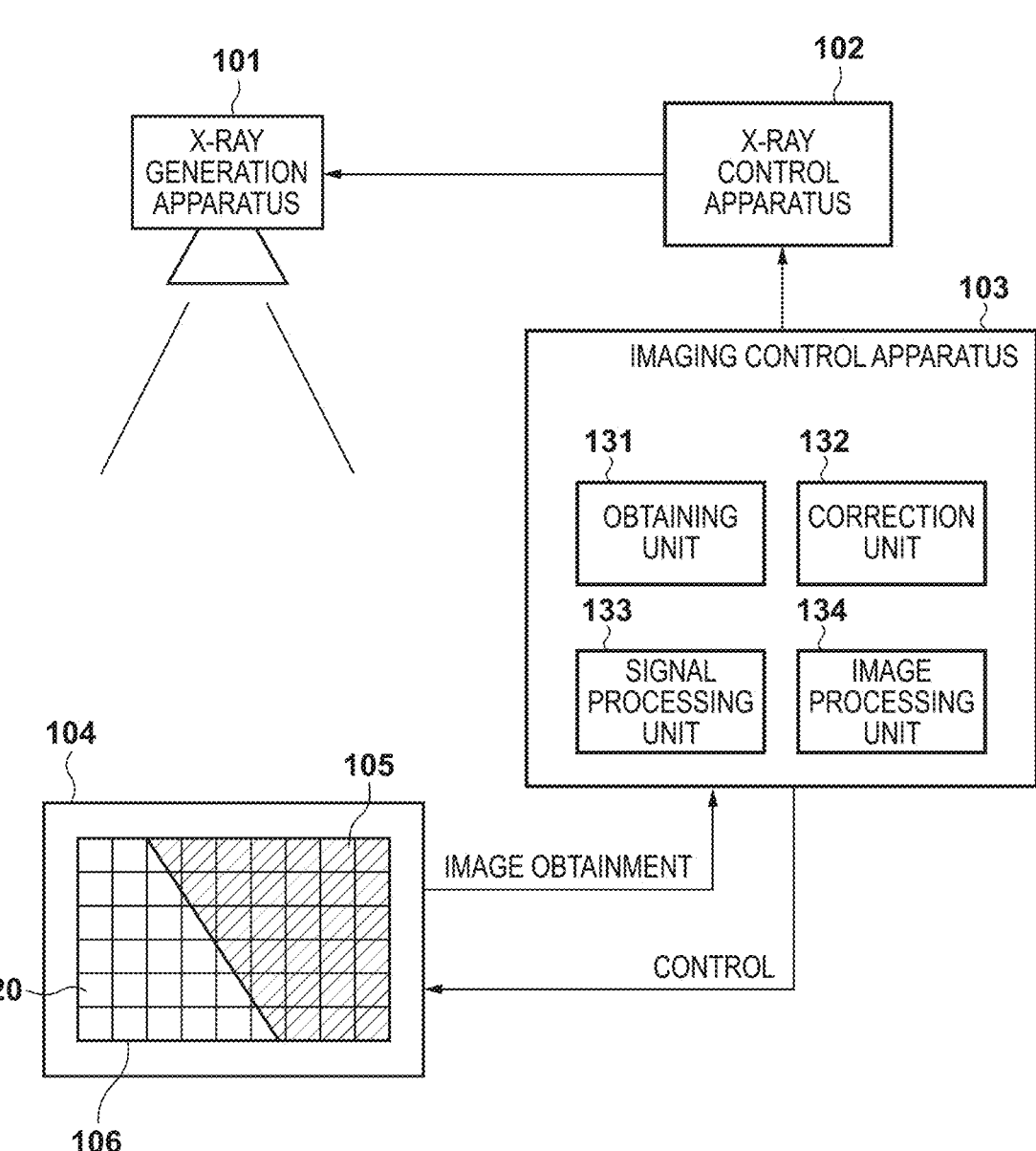

F I G. 5
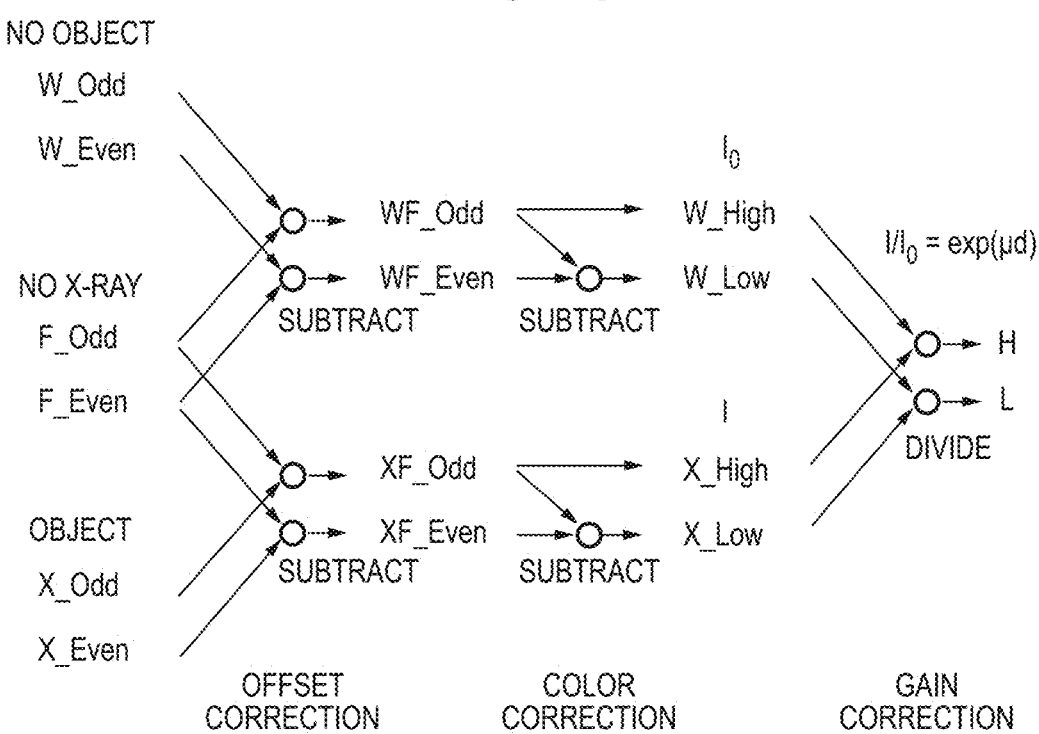
F I G. 6
F I G. 7

F I G.  8
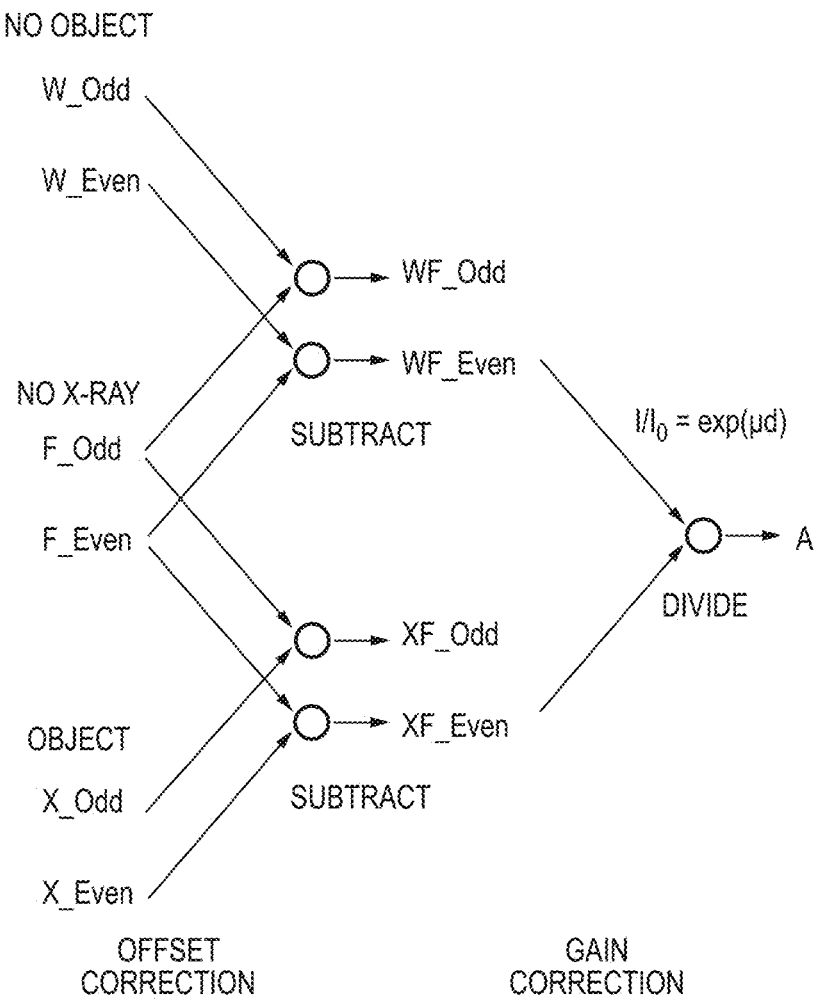

FIG. 9

THICKNESS IMAGE T

GAUSSIAN

AFTER NOISE REDUCTION

FIG. 12

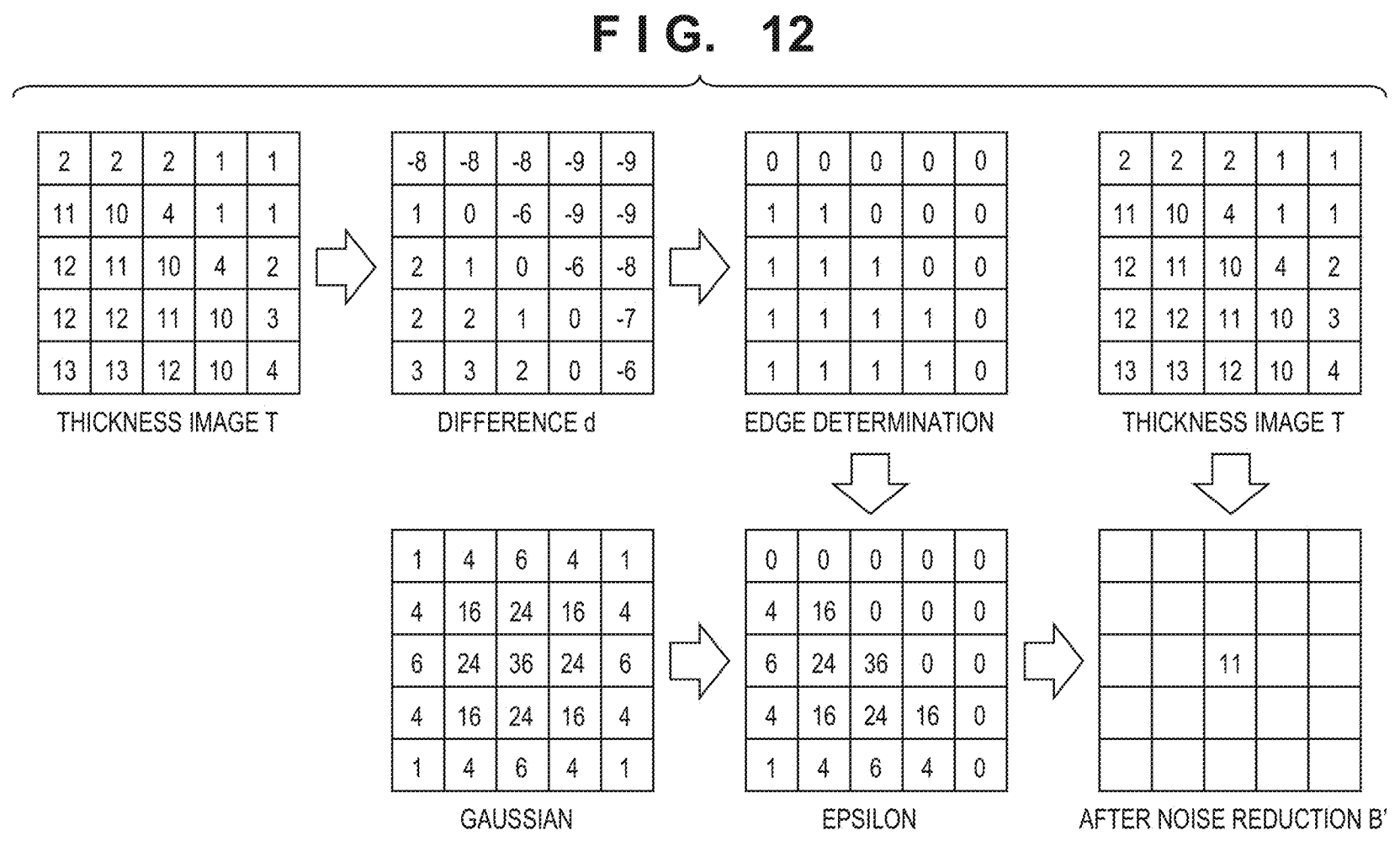

THICKNESS IMAGE T

| 1 | 1 | 2 | 2 | 2 |
| 1 | 1 | 4 | 10 | 11 |
| 2 | 4 | 10 | 11 | 12 |
| 3 | 10 | 11 | 12 | 12 |
| 4 | 10 | 12 | 13 | 13 |

DIFFERENCE d

| -9 | -9 | -8 | -8 | -8 |
| -9 | -9 | -6 | 0 | 1 |
| -8 | -6 | 0 | 1 | 2 |
| -7 | 0 | 1 | 2 | 2 |
| -6 | 0 | 2 | 3 | 3 |

EDGE DETERMINATION

| 0 | 0 | 0 | 0 | 0 |
| 0 | 0 | 0 | 1 | 1 |
| 0 | 0 | 1 | 1 | 1 |
| 0 | 1 | 1 | 1 | 1 |
| 0 | 1 | 1 | 1 | 1 |

GAUSSIAN

| 1 | 4 | 6 | 4 | 1 |
| 4 | 16 | 24 | 16 | 4 |
| 6 | 24 | 36 | 24 | 6 |
| 4 | 16 | 24 | 16 | 4 |
| 1 | 4 | 6 | 4 | 1 |

EPSILON

| 0 | 0 | 0 | 0 | 0 |
| 0 | 0 | 0 | 16 | 4 |
| 0 | 0 | 36 | 24 | 6 |
| 0 | 16 | 24 | 16 | 4 |
| 0 | 4 | 6 | 4 | 1 |

THICKNESS IMAGE T

| 1 | 1 | 2 | 2 | 2 |
| 1 | 1 | 4 | 10 | 11 |
| 2 | 4 | 10 | 11 | 12 |
| 3 | 10 | 11 | 12 | 12 |
| 4 | 10 | 12 | 13 | 13 |

AFTER NOISE REDUCTION B'

| | | | | |
| | | | | |
| | | 11 | | |
| | | | | |
| | | | | |

FIG. 13

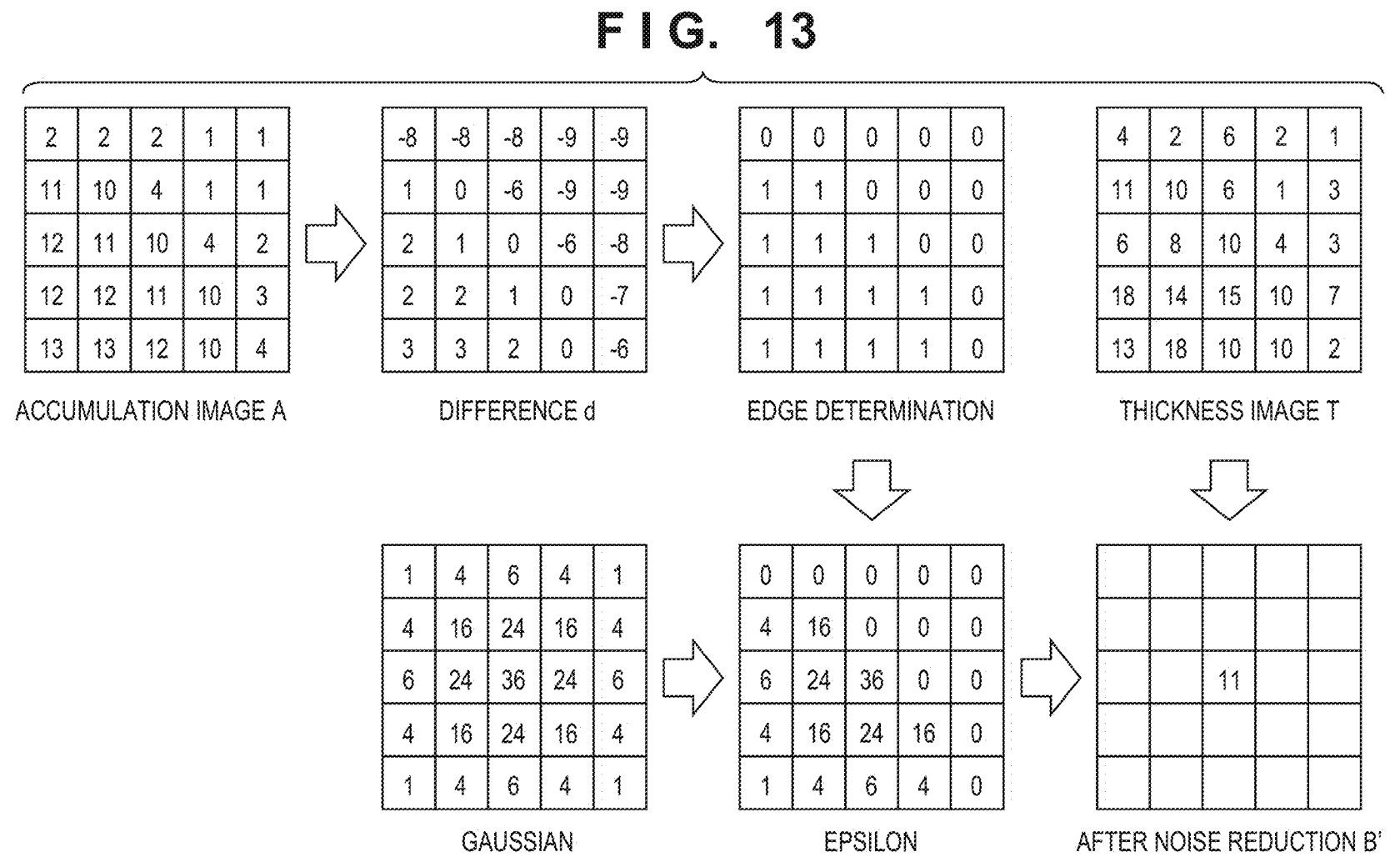

ACCUMULATION IMAGE A

| | | | | |
|---|---|---|---|---|
| 1 | 1 | 2 | 2 | 2 |
| 1 | 1 | 4 | 10 | 11 |
| 2 | 4 | 10 | 11 | 12 |
| 3 | 10 | 11 | 12 | 12 |
| 4 | 10 | 12 | 13 | 13 |

DIFFERENCE d

| | | | | |
|---|---|---|---|---|
| -9 | -9 | -8 | -8 | -8 |
| -9 | -9 | -6 | 0 | 1 |
| -8 | -6 | 0 | 1 | 2 |
| -7 | 0 | 1 | 2 | 2 |
| -6 | 0 | 2 | 3 | 3 |

EDGE DETERMINATION

| | | | | |
|---|---|---|---|---|
| 0 | 0 | 0 | 0 | 0 |
| 0 | 0 | 0 | 1 | 1 |
| 0 | 0 | 1 | 1 | 1 |
| 0 | 1 | 1 | 1 | 1 |
| 0 | 1 | 1 | 1 | 1 |

THICKNESS IMAGE T

| | | | | |
|---|---|---|---|---|
| 1 | 2 | 6 | 2 | 4 |
| 3 | 1 | 6 | 10 | 11 |
| 3 | 4 | 10 | 8 | 6 |
| 7 | 10 | 15 | 14 | 18 |
| 2 | 10 | 10 | 18 | 13 |

GAUSSIAN

| | | | | |
|---|---|---|---|---|
| 1 | 4 | 6 | 4 | 1 |
| 4 | 16 | 24 | 16 | 4 |
| 6 | 24 | 36 | 24 | 6 |
| 4 | 16 | 24 | 16 | 4 |
| 1 | 4 | 6 | 4 | 1 |

EPSILON

| | | | | |
|---|---|---|---|---|
| 0 | 0 | 0 | 0 | 0 |
| 0 | 0 | 0 | 16 | 4 |
| 0 | 0 | 36 | 24 | 6 |
| 0 | 16 | 24 | 16 | 4 |
| 0 | 4 | 6 | 4 | 1 |

AFTER NOISE REDUCTION B'

| | | | | |
|---|---|---|---|---|
| | | | | |
| | | | | |
| | | 11 | | |
| | | | | |
| | | | | |

F I G.  14
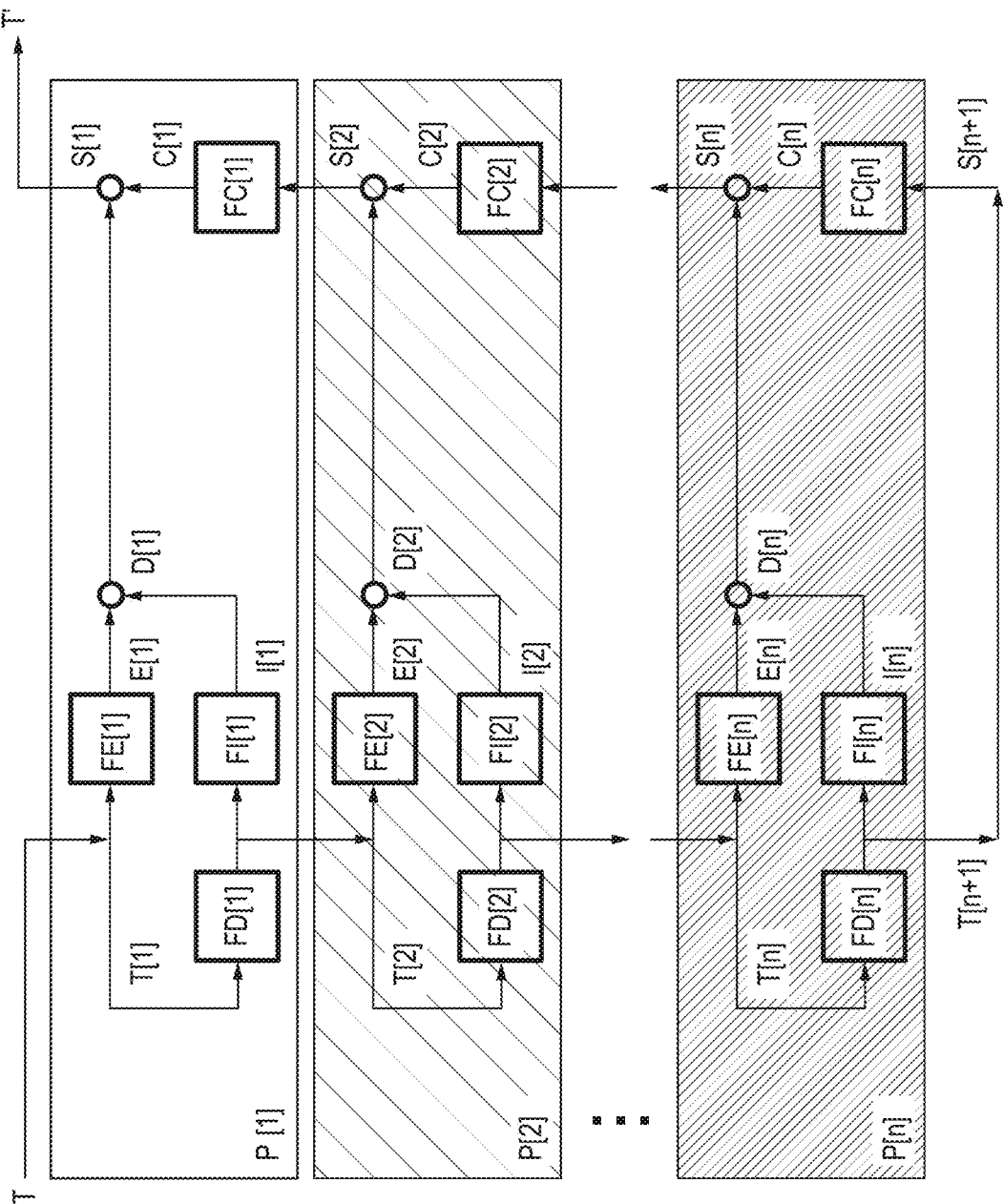

IMAGE PROCESSING APPARATUS, RADIATION IMAGING SYSTEM, IMAGE PROCESSING METHOD, AND NON-TRANSITORY COMPUTER-READABLE STORAGE MEDIUM

BACKGROUND OF THE INVENTION

Field of the Invention

The disclosed technique relates to an image processing apparatus, a radiation imaging system, an image processing method, and a non-transitory computer-readable storage medium and, more particularly, to an image processing apparatus used for still image capturing such as general imaging or moving image capturing such as fluoroscopic imaging in medical diagnosis, a radiation imaging system, an image processing method, and a non-transitory computer-readable storage medium.

Description of the Related Art

A radiation imaging apparatus using a flat panel detector (to be abbreviated as an FPD hereinafter) formed by a semiconductor material is currently widespread as an imaging apparatus used for medical imaging diagnosis or non-destructive inspection by X-rays.

In energy subtraction that is an imaging method using an FPD, a plurality of images of different energies, which are obtained by emitting X-rays of different tube voltages, are processed, thereby obtaining a material decomposition image with a reduced contrast, for example, a bone image or a soft tissue image (Japanese Patent Laid-Open No. 2019-162358).

In Interventional Radiology (IVR) using an FPD, a contrast agent is injected into blood vessels, a medical device such as a catheter or a guide wire is inserted into the blood vessels, and a treatment is conducted while confirming the positions and shapes of the contrast agent and the medical device. If the contrast of a soft tissue or bone is reduced using energy subtraction, the visibility of the contrast agent or the medical device improves. However, there may be a problem that noise in an image increases.

The disclosed technique provides a technique capable of obtaining an image with reduced noise.

SUMMARY OF THE INVENTION

According to one aspect of the present invention, there is provided an image processing apparatus comprising: a processing unit configured to perform noise reduction processing and material decomposition processing using a plurality of images corresponding to a plurality of different radiation energies obtained by irradiating an object with radiation and performing imaging, wherein the processing unit generates a noise reduction image by applying filter processing for each frequency component obtained by resolving a thickness image of a material obtained by the material decomposition processing into a plurality of frequencies, and generates an image by material re-decomposition processing using the thickness image after noise reduction, which is obtained by combining the noise reduction images for each frequency component and an accumulation image obtained based on combining of the plurality of images.

Further features of the present invention will become apparent from the following description of exemplary embodiments (with reference to the attached drawings).

BRIEF DESCRIPTION OF THE DRAWINGS

FIG. 1 is a view showing an example of the configuration of an X-ray imaging system according to a first embodiment;

FIG. 5 is a view for explaining correction processing according to the first embodiment;

FIG. 6 is a block diagram of signal processing according to the first embodiment;

FIG. 7 is a block diagram of image processing according to the first embodiment;

FIG. 8 is a block diagram of correction processing according to the first embodiment;

FIG. 9 is a view exemplarily showing an accumulation image A and a bone image B according to the first embodiment;

FIG. 12 is a view for explaining noise reduction processing by an Epsilon filter;

FIG. 13 is a view for exemplarily explaining edge determination processing by an accumulation image;

FIG. 14 is a view for exemplarily explaining noise reduction processing by frequency resolution according to a second embodiment;

DESCRIPTION OF THE EMBODIMENTS

Figure 2:
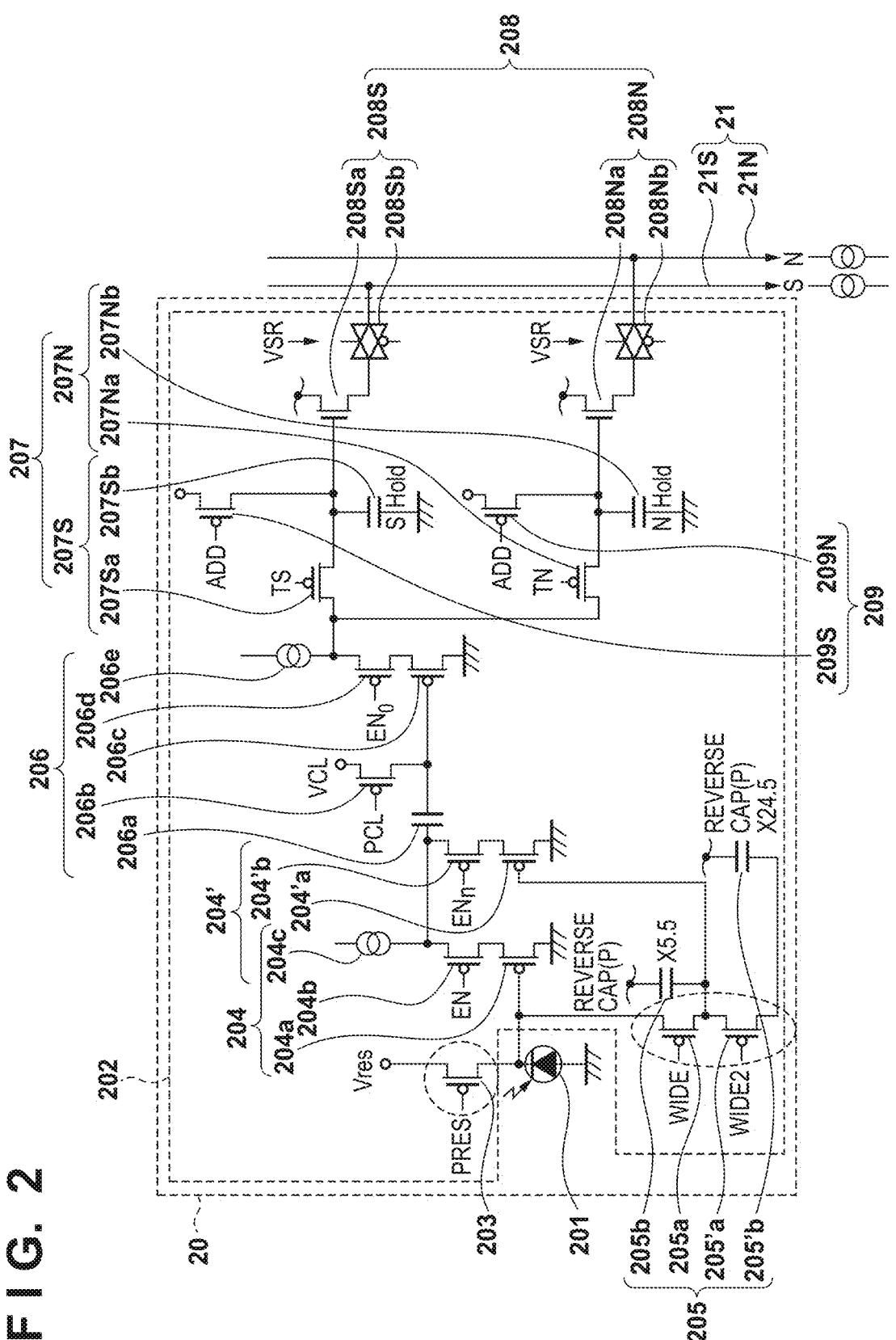
FIG. 2 is an equivalent circuit diagram of a pixel in an X-ray imaging apparatus according to the first embodiment.

Hereinafter, embodiments will be described in detail with reference to the accompanying drawings. It should be noted that the following embodiments are not intended to limit the scope of the appended claims. A plurality of features are described in the embodiments, but not all the plurality of features are necessarily essential to the present invention, and the plurality of features may arbitrarily be combined. Also, in the accompanying drawings, the same reference numerals denote the same or similar parts, and a repetitive description will be omitted.

Note that radiation according to the disclosed technique includes not only α-rays, β-rays, and γ-rays that are beams generated by particles (including photons) emitted by radioactive decay but also beams having equal or more energy, for example, X-rays, particle rays, and cosmic rays. In the following embodiments, an apparatus using X-rays as an example of radiation will be described. Therefore, an X-ray imaging apparatus and an X-ray imaging system will be described below as a radiation imaging apparatus and a radiation imaging system, respectively.

First Embodiment

FIG. 1 is a block diagram showing an example of the configuration of an X-ray imaging system as an example of a radiation imaging system according to the first embodiment. The X-ray imaging system according to the first embodiment includes an X-ray generation apparatus 101, an X-ray control apparatus 102, an imaging control apparatus 103, and an X-ray imaging apparatus 104 (radiation imaging apparatus).

The X-ray generation apparatus 101 generates X-rays and irradiates an object with the X-rays. The X-ray control apparatus 102 controls generation of X-rays in the X-ray generation apparatus 101. The imaging control apparatus 103 includes, for example, one or a plurality of processors (CPUs) and a memory, and the processor executes a program stored in the memory to obtain an X-ray image and perform image processing. Note that each of processes including the image processing performed by the imaging control apparatus 103 may be implemented by dedicated hardware or by cooperation of hardware and software. The X-ray imaging apparatus 104 includes a phosphor 105 that converts X-rays into visible light, and a two-dimensional detector 106 that detects visible light. The two-dimensional detector is a sensor in which pixels 20 for detecting X-ray quanta are arranged in an array of X columns×Y rows, and outputs image information.

The imaging control apparatus 103 functions as an image processing apparatus that processes a radiation image by the above-described processor. An obtaining unit 131, a correction unit 132, a signal processing unit 133, and an image processing unit 134 indicate examples of the functional components of an image processing apparatus. The radiation imaging system includes the imaging control apparatus 103 (image processing apparatus) and the communicably connected X-ray imaging apparatus 104 (radiation imaging apparatus).

The obtaining unit 131 obtains a plurality of radiation images of energies different from each other, which are obtained by irradiating an object with radiation and performing imaging. The obtaining unit 131 obtains, as the plurality of radiation images, radiation images obtained by performing a sample and hold operation a plurality of times during one shot of radiation application.

The correction unit 132 generates a plurality of images to be used for energy subtraction processing by correcting the plurality of radiation images obtained by the obtaining unit 131.

The signal processing unit 133 performs noise reduction processing and material decomposition processing by energy subtraction using the plurality of images corresponding to the plurality of radiation energies different from each other, which are obtained by irradiating the object with radiation and performing imaging. The signal processing unit 133 generates a noise reduction image by applying filter processing for each frequency component obtained by resolving a thickness image of a material obtained by material decomposition processing into a plurality of frequencies, and generates an image by material re-decomposition processing using the thickness image after noise reduction, which is obtained by combining the noise reduction images for each frequency component and an accumulation image obtained based on addition (combining) of the plurality of images. The signal processing unit 133 generates a thickness image of a material using the plurality of images corresponding to the plurality of radiation energies different from each other, which are obtained by irradiating the object with radiation and performing imaging, generates the noise reduction images of the frequency components by applying filter processing for each frequency component in the thickness image of the material, and combines the noise reduction images, thereby generating the thickness image after noise reduction. The signal processing unit 133 generates a material characteristic image using a plurality of images generated by the correction unit 132. The material characteristic image is an image obtained in energy subtraction processing, such as a material decomposition image representing a decomposed material such as a bone or a soft tissue, or a material identification image representing an effective atomic number and its surface density.

The plurality of radiation energies include a first radiation energy (high energy) and a second radiation energy (low energy) lower than the first radiation energy. The signal processing unit 133 performs material decomposition processing for generating a first material decomposition image representing the thickness of a first material contained in an object and a second material decomposition image representing the thickness of a second material different from the first material using a first image (high energy image H) captured using the first radiation energy (high energy) and a second image (low energy image L) captured using the second radiation energy (low energy). The signal processing unit 133 performs material decomposition processing using the plurality of radiation images captured using different radiation energies, thereby generating the first material decomposition image representing the thickness of the first material and the second material decomposition image representing the thickness of the second material different from the first material. Also, the signal processing unit 133 generates a thickness image that combines the thickness of the first material and the thickness of the second material. Here, the first material includes at least calcium, hydroxyapatite, or bone, and the second material includes at least water, fat, or a soft tissue that does not contain calcium. Details of the signal processing unit 133 will be described later. The image processing unit 134 generates a display image using the material characteristic image obtained by signal processing of the signal processing unit 133.

FIG. 2 is an equivalent circuit diagram of the pixel 20 according to the first embodiment. The pixel 20 includes a photoelectric converting element 201 and an output circuit unit 202. The photoelectric converting element 201 can typically be a photodiode. The output circuit unit 202 includes an amplification circuit unit 204, a clamp circuit unit 206, a sample and hold circuit unit 207, and a selection circuit unit 208.

The photoelectric converting element 201 includes a charge accumulation portion. The charge accumulation portion is connected to the gate of a MOS transistor 204a of the amplification circuit unit 204. The source of the MOS transistor 204a is connected to a current source 204c via a MOS transistor 204b. The MOS transistor 204a and the current source 204c form a source follower circuit. The MOS transistor 204b is an enable switch that is turned on when an enable signal EN supplied to its gate is set at an active level, and sets the source follower circuit in an operation state.

In the example shown in FIG. 2, the charge accumulation portion of the photoelectric converting element 201 and the gate of the MOS transistor 204a form a common node, and this node functions as a charge-voltage converter that converts charges accumulated in the charge accumulation portion into a voltage. That is, a voltage V (=Q/C) determined by charges Q accumulated in the charge accumulation portion and a capacitance value C of the charge-voltage converter appears in the charge-voltage converter. The charge-voltage converter is connected to a reset potential Vres via a reset switch 203. When a reset signal PRES is set at an active level, the reset switch 203 is turned on, and the potential of the charge-voltage converter is reset to the reset potential Vres.

The clamp circuit unit 206 clamps, by a clamp capacitor 206*a*, noise output from the amplification circuit unit 204 in accordance with the reset potential of the charge-voltage converter. That is, the clamp circuit unit 206 is a circuit configured to cancel the noise from a signal output from the source follower circuit in accordance with charges generated by photoelectric conversion in the photoelectric converting element 201. The noise includes kTC noise at the time of reset. Clamping is performed by turning on a MOS transistor 206*b* by setting a clamp signal PCL at an active level, and then turning off the MOS transistor 206*b* by setting the clamp signal PCL at an inactive level. The output side of the clamp capacitor 206*a* is connected to the gate of a MOS transistor 206*c*. The source of the MOS transistor 206*c* is connected to a current source 206*e* via a MOS transistor 206*d*. The MOS transistor 206*c* and the current source 206*e* form a source follower circuit. The MOS transistor 206*d* is an enable switch that is turned on when an enable signal EN0 supplied to its gate is set at an active level, and sets the source follower circuit in an operation state.

The signal output from the clamp circuit unit 206 in accordance with charges generated by photoelectric conversion in the photoelectric converting element 201 is written, as an optical signal, in a capacitor 207S*b* via a switch 207S*a* when an optical signal sampling signal TS is set at an active level. The signal output from the clamp circuit unit 206 when turning on the MOS transistor 206*b* immediately after resetting the potential of the charge-voltage converter is a clamp voltage. The noise signal is written in a capacitor 207N*b* via a switch 207N*a* when a noise sampling signal TN is set at an active level. This noise signal includes an offset component of the clamp circuit unit 206. The switch 207S*a* and the capacitor 207S*b* form a signal sample and hold circuit 207S, and the switch 207N*a* and the capacitor 207N*b* form a noise sample and hold circuit 207N. The sample and hold circuit unit 207 includes the signal sample and hold circuit 207S and the noise sample and hold circuit 207N.

When a driving circuit unit drives a row selection signal to an active level, the signal (optical signal) held in the capacitor 207S*b* is output to a signal line 21S via a MOS transistor 208S*a* and a row selection switch 208S*b*. In addition, the signal (noise) held in the capacitor 207N*b* is simultaneously output to a signal line 21N via a MOS transistor 208N*a* and a row selection switch 208N*b*. The MOS transistor 208S*a* forms a source follower circuit (not shown) with a constant current source provided on the signal line 21S. Similarly, the MOS transistor 208N*a* forms a source follower circuit (not shown) with a constant current source provided on the signal line 21N. The MOS transistor 208S*a* and the row selection switch 208S*b* form a signal selection circuit unit 208S, and the MOS transistor 208N*a* and the row selection switch 208N*b* form a noise selection circuit unit 208N. The selection circuit unit 208 includes the signal selection circuit unit 208S and the noise selection circuit unit 208N.

The pixel 20 may include an addition switch 209S that adds the optical signals of the plurality of adjacent pixels 20. In an addition mode, an addition mode signal ADD is set at an active level, and the addition switch 209S is turned on. This causes the addition switch 209S to interconnect the capacitors 207S*b* of the adjacent pixels 20, and the optical signals are averaged. Similarly, the pixel 20 may include an addition switch 209N that adds noise components of the plurality of adjacent pixels 20. When the addition switch

209N is turned on, the capacitors 207N*b* of the adjacent pixels 20 are interconnected by the addition switch 209N, thereby averaging the noise components. An adder 209 includes the addition switches 209S and 209N.

Furthermore, the pixel 20 may include a sensitivity changing unit 205 for changing the sensitivity. The pixel 20 can include, for example, a first sensitivity change switch 205*a*, a second sensitivity change switch 205'*a*, and their circuit elements. When a first change signal WIDE is set at an active level, the first sensitivity change switch 205*a* is turned on to add the capacitance value of a first additional capacitor 205*b* to the capacitance value of the charge-voltage converter. This decreases the sensitivity of the pixel 20. When a second change signal WIDE2 is set at an active level, the second sensitivity change switch 205'*a* is turned on to add the capacitance value of a second additional capacitor 205'*b* to the capacitance value of the charge-voltage converter. This further decreases the sensitivity of the pixel 20. In this way, it is possible to receive a larger light amount by adding a function of decreasing the sensitivity of the pixel 20, thereby widening a dynamic range. When the first change signal WIDE is set at the active level, an enable signal ENw may be set at an active level to cause a MOS transistor 204'*a* to perform a source follower operation instead of the MOS transistor 204*a*.

The X-ray imaging apparatus 104 reads out the output of the above-described pixel circuit from the two-dimensional detector 106, causes an A/D converter (not shown) to convert the output into a digital value, and then transfers an image to the imaging control apparatus 103.

Figure 3:
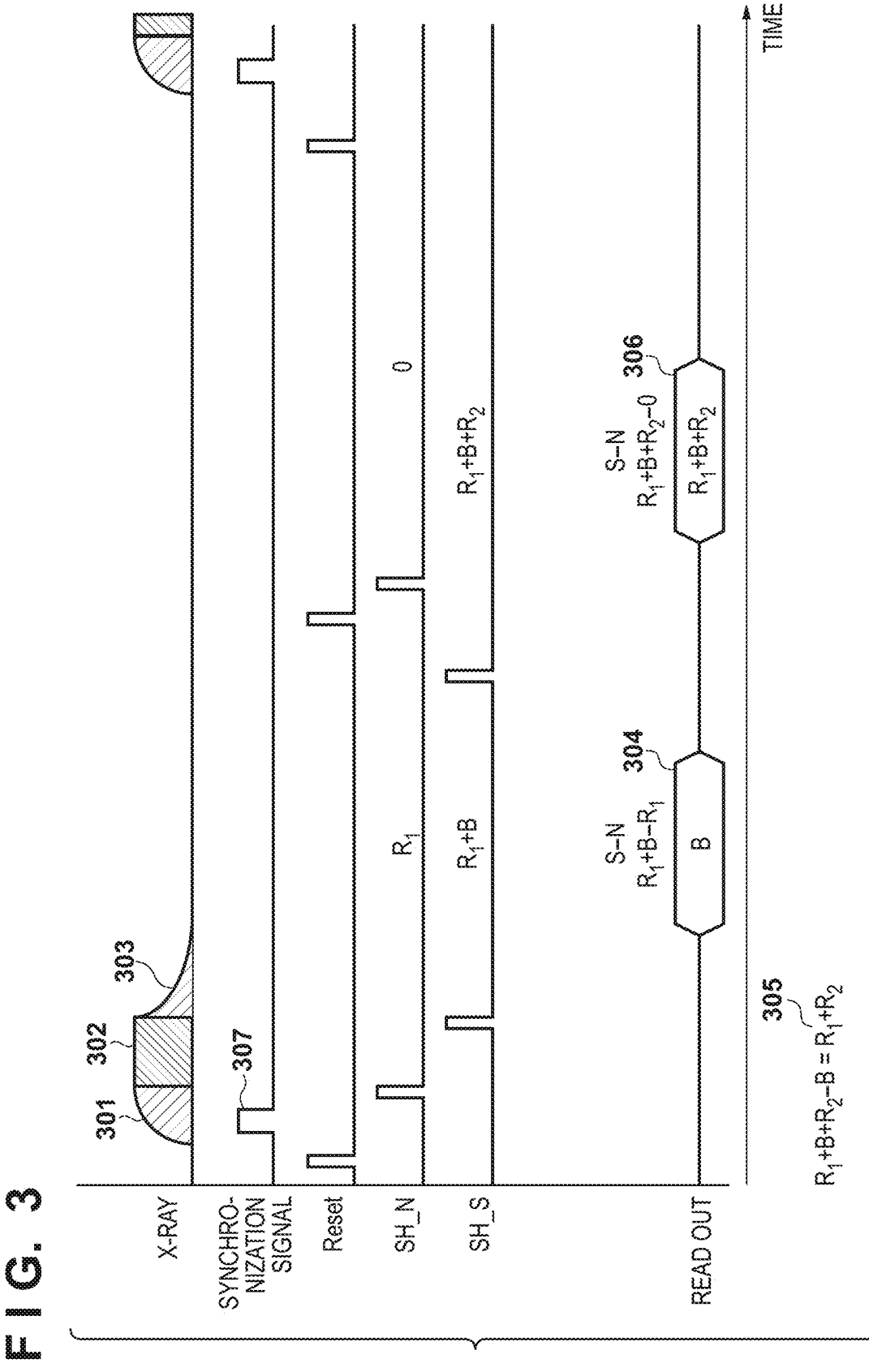
FIG. 3 is a timing chart of the X-ray imaging apparatus according to the first embodiment.

The operation of the X-ray imaging system having the above-described configuration according to the first embodiment will be described next. FIG. 3 shows the driving timing of the X-ray imaging apparatus 104 when energy subtraction is performed in the X-ray imaging system according to the first embodiment. When the abscissa represents the time, waveforms in FIG. 3 indicate timings of X-ray application, a synchronization signal, reset of the photoelectric converting element 201, the sample and hold circuit 207, and readout of an image from a signal line 21.

After the reset signal resets the photoelectric converting element 201, X-rays are applied. The tube voltage of the X-rays ideally has a rectangular waveform but it takes a finite time for the tube voltage to rise or fall. Especially, if pulsed X-rays are applied and the application time is short, the tube voltage is not considered to have a rectangular waveform any more, and has waveforms, as indicated by X-rays 301 to 303. The X-rays 301 during the rising period, the X-rays 302 during the stable period, and the X-rays 303 during the falling period have different X-ray energies. Therefore, by obtaining an X-ray image corresponding to radiation during a period divided by a sample and hold operation, a plurality of kinds of X-ray images of different energies are obtained.

The X-ray imaging apparatus 104 causes the noise sample and hold circuit 207N to perform sampling after application of the X-rays 301 during the rising period, and causes the signal sample and hold circuit 207S to perform sampling after application of the X-rays 302 during the stable period. After that, the X-ray imaging apparatus 104 reads out, as an image, the difference between the signal lines 21N and 21S. At this time, a signal ($R_1$) of the X-rays 301 during the rising period is held in the noise sample and hold circuit 207N, and the sum ($R_1$+B) of the signal of the X-rays 301 during the rising period and a signal (B) of the X-rays 302 during the stable period is held in the signal sample and hold circuit 207S. Therefore, an image 304 corresponding to the signal of the X-rays 302 during the stable period is read out.

Next, after completion of application of the X-rays 303 during the falling period and readout of the image 304, the X-ray imaging apparatus 104 causes the signal sample and hold circuit 207S to perform sampling again. After that, the X-ray imaging apparatus 104 resets the photoelectric converting element 201, causes the noise sample and hold circuit 207N to perform sampling again, and reads out, as an image, the difference between the signal lines 21N and 21S. At this time, a signal in a state in which no X-rays are applied is held in the noise sample and hold circuit 207N, and the sum $(R_1+B+R_2)$ of the signal of the X-rays 301 during the rising period, the signal of the X-rays 302 during the stable period, and a signal $(R_2)$ of the X-rays 303 during the falling period is held in the signal sample and hold circuit 207S. Therefore, an image 306 corresponding to the signal of the X-rays 301 during the rising period, the signal of the X-rays 302 during the stable period, and the signal of the X-rays 303 during the falling period is read out. After that, by calculating the difference between the images 306 and 304, an image 305 corresponding to the sum of the X-rays 301 during the rising period and the X-rays 303 during the falling period is obtained. This calculation processing may be performed by the X-ray imaging apparatus 104 or the imaging control apparatus 103.

The timing of resetting the sample and hold circuit 207 and the photoelectric converting element 201 is decided using a synchronization signal 307 indicating the start of application of X-rays from the X-ray generation apparatus 101. As a method of detecting the start of application of X-rays, a configuration for measuring the tube current of the X-ray generation apparatus 101 and determining whether the current value exceeds a preset threshold can be used but the present invention is not limited to this. For example, a configuration for detecting the start of application of X-rays by repeatedly reading out the pixel 20 and determining whether the pixel value exceeds a preset threshold after completion of the reset of the photoelectric converting element 201 may be used.

Alternatively, for example, a configuration for detecting the start of application of X-rays by incorporating an X-ray detector different from the two-dimensional detector 106 in the X-ray imaging apparatus 104 and determining whether a measured value of the X-ray detector exceeds a preset threshold may be used. In either method, after a time designated in advance elapses after the input of the synchronization signal 307 indicating the start of application of X-rays, sampling of the signal sample and hold circuit 207S, sampling of the noise sample and hold circuit 207N, and reset of the photoelectric converting element 201 are performed.

As described above, the image 304 corresponding to the stable period of the pulsed X-rays and the image 305 corresponding to the sum of the signal during the rising period and that during the falling period are obtained. Since the energies of the X-rays applied when forming the two X-ray images are different, calculation is performed for the X-ray images, thereby making it possible to perform energy subtraction processing.

Figure 4:
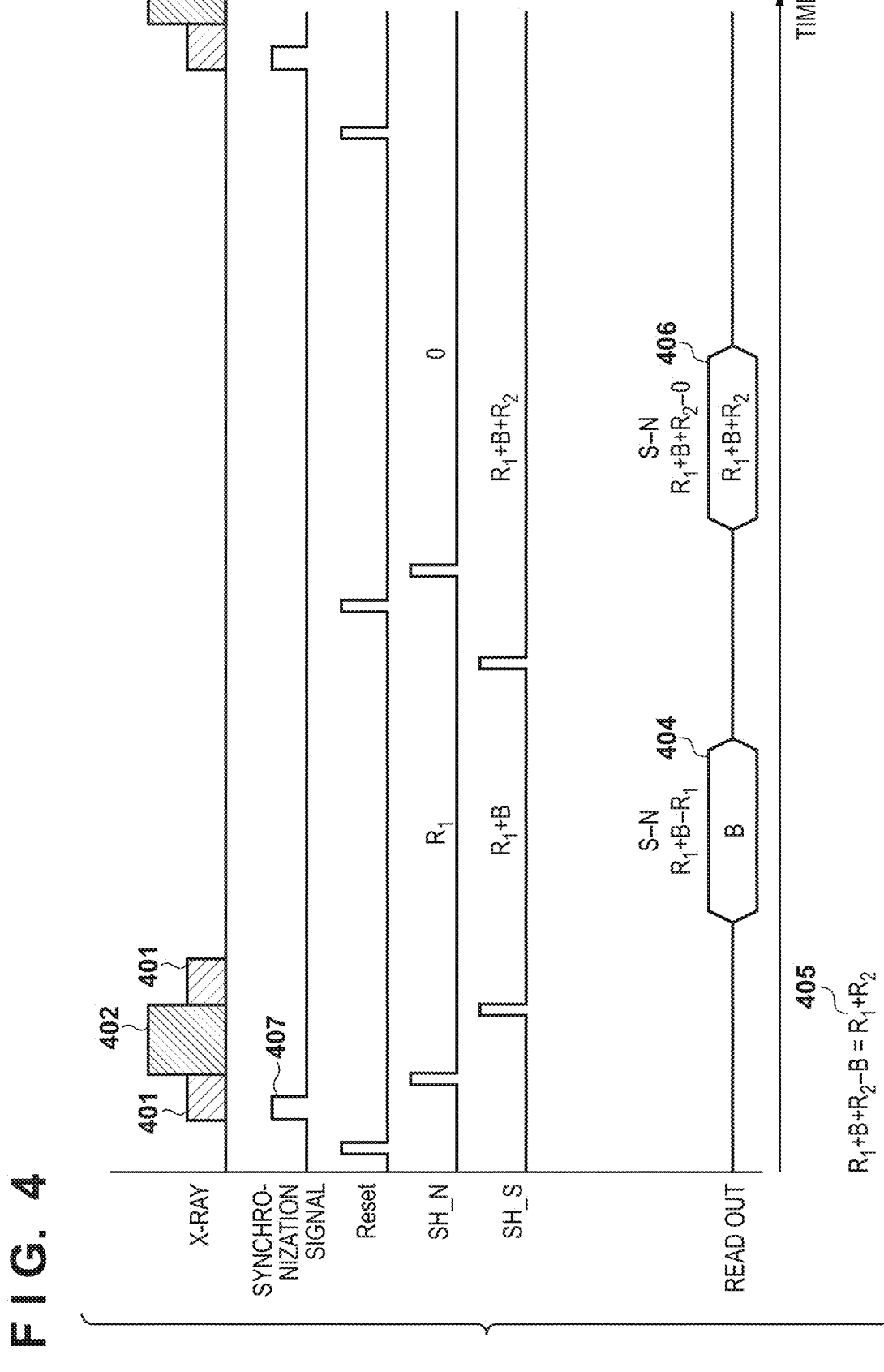
FIG. 4 is a timing chart of the X-ray imaging apparatus according to the first embodiment.

FIG. 4 shows the driving timing of the X-ray imaging apparatus 104 when energy subtraction is performed in the X-ray imaging system according to the first embodiment. The driving timing shown in FIG. 4 is different from the driving timing shown in FIG. 3 in that the tube voltage of the X-ray generation apparatus 101 is actively switched.

First, after the reset of the photoelectric converting element 201, the X-ray generation apparatus 101 applies low energy X-rays 401. In this state, the X-ray imaging apparatus 104 causes the noise sample and hold circuit 207N to perform sampling. After that, the X-ray generation apparatus 101 switches the tube voltage to apply high energy X-rays 402. In this state, the X-ray imaging apparatus 104 causes the signal sample and hold circuit 207S to perform sampling. After that, the X-ray generation apparatus 101 switches the tube voltage to apply low energy X-rays 403. The X-ray imaging apparatus 104 reads out, as an image, the difference between the signal lines 21N and 21S. At this time, a signal $(R_1)$ of the low energy X-rays 401 is held in the noise sample and hold circuit 207N, and the sum $(R_1+B)$ of the signal of the low energy X-rays 401 and a signal (B) of the high energy X-rays 402 is held in the signal sample and hold circuit 207S. Therefore, an image 404 corresponding to the signal of the high energy X-rays 402 is read out.

Next, after completion of the application of the low energy X-rays 403 and the readout of the image 404, the X-ray imaging apparatus 104 causes the signal sample and hold circuit 207S to perform sampling again. After that, the X-ray imaging apparatus 104 resets the photoelectric converting element 201, causes the noise sample and hold circuit 207N to perform sampling again, and reads out, as an image, the difference between the signal lines 21N and 21S. At this time, a signal in a state in which no X-rays are applied is held in the noise sample and hold circuit 207N, and the sum $(R_1+B+R_2)$ of the signal of the low energy X-rays 401, the signal of the high energy X-rays 402, and a signal $(R_2)$ of the low energy X-rays 403 is held in the signal sample and hold circuit 207S. Therefore, an image 406 corresponding to the signal of the low energy X-rays 401, the signal of the high energy X-rays 402, and the signal of the low energy X-rays 403 is read out.

After that, by calculating the difference between the images 406 and 404, an image 405 corresponding to the sum of the low energy X-rays 401 and the low energy X-rays 403 is obtained. This calculation processing may be performed by the X-ray imaging apparatus 104 or the imaging control apparatus 103. With respect to a synchronization signal 407, the same as in FIG. 3 applies. As described above, by obtaining images while actively switching the tube voltage, the energy difference between radiation images of low energy and high energy can be made large, as compared with the method shown in FIG. 3.

Next, energy subtraction processing by the imaging control apparatus 103 will be described. The energy subtraction processing according to the first embodiment is divided into three stages of correction processing by the correction unit 132, signal processing by the signal processing unit 133, and image processing by the image processing unit 134. Each process will be described below.

The correction processing is processing of generating, by processing a plurality of radiation images obtained from the X-ray imaging apparatus 104, a plurality of images to be used for the signal processing (to be described later) in the energy subtraction processing. FIG. 5 is a block diagram of the correction processing for the energy subtraction processing according to the first embodiment. First, the obtaining unit 131 causes the X-ray imaging apparatus 104 to perform imaging in a state in which no X-rays are applied, thereby obtaining images by the driving operation shown in FIG. 3 or 4. With this driving operation, two images are read out. The first image (image 304 or 404) will be referred to as F_ODD hereinafter and the second image (image 306 or 406) will be referred to as F_EVEN hereinafter. Each of F_ODD and F_EVEN is an image corresponding to FPN (Fixed Pattern Noise) of the X-ray imaging apparatus 104.

Next, the obtaining unit 131 causes the X-ray imaging apparatus 104 to perform imaging by applying X-rays in a state in which there is no object, thereby obtaining gain correction images output from the X-ray imaging apparatus 104 by the driving operation shown in FIG. 3 or 4. With this driving operation, two images are read out, similar to the above operation. The first gain correction image (image 304 or 404) will be referred to as W_ODD hereinafter and the second gain correction image (image 306 or 406) will be referred to as W_EVEN hereinafter. Each of W_ODD and W_EVEN is an image corresponding to the sum of the FPN of the X-ray imaging apparatus 104 and the signal by X-rays. The correction unit 132 subtracts F_ODD from W_ODD and F_EVEN from W_EVEN, thereby obtaining images WF_ODD and WF_EVEN from each of which the FPN of the X-ray imaging apparatus 104 has been removed. This is called offset correction.

WF_ODD is an image corresponding to the X-rays 302 during the stable period, and WF_EVEN is an image corresponding to the sum of the X-rays 301 during the rising period, the X-rays 302 during the stable period, and the X-rays 303 during the falling period. Therefore, the correction unit 132 obtains an image corresponding to the sum of the X-rays 301 during the rising period and the X-rays 303 during the falling period by subtracting WF_ODD from WF_EVEN. The processing of obtaining an image corresponding to X-rays during a specific period divided by the sample and hold operation by subtraction of a plurality of images is called color correction. The energy of the X-rays 301 during the rising period and that of the X-rays 303 during the falling period are lower than the energy of the X-rays 302 during the stable period. Therefore, by subtracting WF_ODD from WF_EVEN by color correction, a low energy image W_Low when there is no object is obtained. Furthermore, a high energy image W_High when there is no object is obtained from WF_ODD.

Next, the obtaining unit 131 causes the X-ray imaging apparatus 104 to perform imaging by applying X-rays in a state in which there is an object, thereby obtaining images output from the X-ray imaging apparatus 104 by the driving operation shown in FIG. 3 or 4. At this time, two images are read out. The first image (image 304 or 404) will be referred to as X_ODD hereinafter and the second image (image 306 or 406) will be referred to as X_EVEN hereinafter. The correction unit 132 performs the same offset correction processing and color correction processing as those when there is no object, thereby obtaining a low energy image X_Low when there is the object and a high energy image X_High when there is the object.

When d represents the thickness of the object, $\mu$ represents the linear attenuation coefficient of the object, $I_0$ represents the output of the pixel 20 when there is no object, and I represents the output of the pixel 20 when there is the object, equation (1) below holds.

$$I = I_0 \, exp(\mu d) \tag{1}$$

Equation (1) is modified to obtain equation (2) below. The right-hand side of equation (2) represents the attenuation rate of the object. The attenuation rate of the object is a real number between 0 and 1.

$$I/I_0 = exp(\mu d) \tag{2}$$

Therefore, the correction unit 132 obtains the attenuation rate image L at low energy (to be also referred to as the "low energy image L" hereinafter) by dividing the low energy image X_Low when there is the object by the low energy image W_Low when there is no object. Similarly, the correction unit 132 obtains the attenuation rate image H at high energy (to be also referred to as the "high energy image H" hereinafter) by dividing the high energy image X_High when there is the object by the high energy image W_High when there is no object. The processing of obtaining an image (L or H) of an attenuation rate at low energy or an attenuation rate at high energy by dividing an image obtained based on a radiation image obtained when there is an object by an image obtained based on a radiation image obtained when there is no object is called gain correction.

FIG. 6 is a block diagram of the signal processing of the energy subtraction processing according to the first embodiment. The signal processing unit 133 generates a material characteristic image using a plurality of images obtained from the correction unit 132. Generation processing of a material decomposition image formed from a bone thickness image B (to be also referred to as a bone image B hereinafter) and a soft tissue thickness image S (to be also referred to as a soft tissue image S hereinafter) will be described below. The signal processing unit 133 performs the following processing to obtain the bone thickness image B and the soft tissue thickness image S from the attenuation rate image L at low energy and the attenuation rate image H at high energy, both of which have been obtained by the correction processing shown in FIG. 5.

First, when E represents the energy of X-ray photons, N(E) represents the number of photons at the energy E, B represents a thickness in a bone thickness image, S represents a thickness in a soft tissue thickness image, $\mu_B(E)$ represents the linear attenuation coefficient of the bone at the energy E, $\mu_S(E)$ represents the linear attenuation coefficient of the soft tissue at the energy E, and $I/I_0$ represents the attenuation rate, equation (3) below holds.

$$I/I_0 = \frac{\int_0^\infty N(E)\exp\{-\mu_B(E)B - \mu_S(E)S\}EdE}{\int_0^\infty N(E)EdE} \tag{3}$$

The number N(E) of photons at the energy E is an X-ray spectrum. The X-ray spectrum is obtained by simulation or actual measurement. Each of the linear attenuation coefficient $\mu_B(E)$ of the bone at the energy E and the linear attenuation coefficient $\mu_S(E)$ of the soft tissue at the energy E is obtained from a database of NIST (National Institute of Standards and Technology) or the like. Therefore, according to equation (3), it is possible to calculate the attenuation rate $I/I_0$ for the thickness B in an arbitrary bone thickness image, the thickness S in a soft tissue thickness image, and the X-ray spectrum N(E).

When $N_L(E)$ represents a low energy X-ray spectrum and $N_H(E)$ represents a high energy X-ray spectrum, equations (4) below hold concerning the attenuation rate of the image L and the attenuation rate of the image H. Note that in the following explanation, the attenuation rate of the image L shown in equations (4) will also simply be referred to as the attenuation rate L at low energy, and the attenuation rate of the image H will also simply be referred to as the attenuation rate H at high energy.

$$L = \frac{\int_0^\infty N_L(E)\exp\{-\mu_B(E)B - \mu_S(E)S\}EdE}{\int_0^\infty N_L(E)EdE} \qquad (4)$$

$$H = \frac{\int_0^\infty N_H(E)\exp\{-\mu_B(E)B - \mu_S(E)S\}EdE}{\int_0^\infty N_H(E)EdE}$$

By solving nonlinear simultaneous equations (4), the thickness B in the bone thickness image and the thickness S in the soft tissue thickness image are obtained. A case in which the Newton-Raphson method is used as a representative method of solving the nonlinear simultaneous equations will be explained. When m represents an iteration count of the Newton-Raphson method, $B^m$ represents a bone thickness after the mth iteration, and $S^m$ represents a soft tissue thickness after the mth iteration, an attenuation rate $H^m$ at high energy after the mth iteration and an attenuation rate $L^m$ at low energy after the mth iteration are given by:

$$L^m = \frac{\int_0^\infty N_L(E)\exp\{-\mu_B(E)B^m - \mu_S(E)S^m\}EdE}{\int_0^\infty N_L(E)EdE} \qquad (5)$$

$$H^m = \frac{\int_0^\infty N_H(E)\exp\{-\mu_B(E)B^m - \mu_S(E)S^m\}EdE}{\int_0^\infty N_H(E)EdE}$$

The change rates of the attenuation rates when the thicknesses slightly change are given by:

$$\frac{\partial H^m}{\partial B^m} = \frac{\int_0^\infty -\mu_B(E)N_H(E)\exp\{-\mu_B(E)B^m - \mu_S(E)S^m\}EdE}{\int_0^\infty N_H(E)EdE} \qquad (6)$$

$$\frac{\partial L^m}{\partial B^m} = \frac{\int_0^\infty -\mu_B(E)N_L(E)\exp\{-\mu_B(E)B^m - \mu_S(E)S^m\}EdE}{\int_0^\infty N_L(E)EdE}$$

$$\frac{\partial H^m}{\partial S^m} = \frac{\int_0^\infty -\mu_S(E)N_H(E)\exp\{-\mu_B(E)B^m - \mu_S(E)S^m\}EdE}{\int_0^\infty N_H(E)EdE}$$

-continued $$\frac{\partial L^m}{\partial S^m} = \frac{\int_0^\infty -\mu_S(E)N_L(E)\exp\{-\mu_B(E)B^m - \mu_S(E)S^m\}EdE}{\int_0^\infty N_L(E)EdE}$$

At this time, using the attenuation rate H at high energy and the attenuation rate L at low energy, a bone thickness $B^{m+1}$ and a soft tissue thickness $S^{m+1}$ after the (m+1)th iteration are given by:

$$\begin{bmatrix} B^{m+1} \\ S^{m+1} \end{bmatrix} = \begin{bmatrix} B^m \\ S^m \end{bmatrix} + \begin{bmatrix} \dfrac{\partial H^m}{\partial B^m} & \dfrac{\partial H^m}{\partial S^m} \\ \dfrac{\partial L^m}{\partial B^m} & \dfrac{\partial L^m}{\partial S^m} \end{bmatrix}^{-1} \begin{bmatrix} H - H^m \\ L - L^m \end{bmatrix} \qquad (7)$$

When det represents a determinant, the inverse matrix of a 2×2 matrix is given, using the Cramer's rule, by:

$$\det = \frac{\partial H^m}{\partial B^m}\frac{\partial L^m}{\partial S^m} - \frac{\partial H^m}{\partial S^m}\frac{\partial L^m}{\partial B^m} \qquad (8)$$

$$\begin{bmatrix} \dfrac{\partial H^m}{\partial B^m} & \dfrac{\partial H^m}{\partial S^m} \\ \dfrac{\partial L^m}{\partial B^m} & \dfrac{\partial L^m}{\partial S^m} \end{bmatrix}^{-1} = \frac{1}{\det} \begin{bmatrix} \dfrac{\partial L^m}{\partial S^m} & -\dfrac{\partial H^m}{\partial S^m} \\ -\dfrac{\partial L^m}{\partial B^m} & \dfrac{\partial H^m}{\partial B^m} \end{bmatrix}$$

Therefore, by substituting equation (8) into equation (7), equations (9) below are obtained.

$$B^{m+1} = B^m + \frac{1}{\det}\frac{\partial L^m}{\partial S^m}(H - H^m) - \frac{1}{\det}\frac{\partial H^m}{\partial S^m}(L - L^m) \qquad (9)$$

$$S^{m+1} = S^m + \frac{1}{\det}\frac{\partial L^m}{\partial B^m}(H - H^m) + \frac{1}{\det}\frac{\partial H^m}{\partial B^m}(L - L^m)$$

When the above calculation processing is repeated, the difference between the attenuation rate Hm at high energy after the mth iteration and the actually measured attenuation rate H at high energy approaches 0. The same applies to the attenuation rate L at low energy. This causes the bone thickness WI after the mth iteration to converge to the bone thickness B, and causes the soft tissue thickness $S^m$ after the mth iteration to converge to the soft tissue thickness S. As described above, the nonlinear simultaneous equations (4) can be solved. Therefore, by calculating equations (4) for all the pixels, the bone thickness image B and the soft tissue thickness image S can be obtained from the attenuation rate image L at low energy and the attenuation rate image H at high energy.

Note that the bone thickness image B and the soft tissue thickness image S are calculated in the first embodiment but the disclosed technique is not limited to this. For example, a water thickness W and a contrast agent thickness I may be calculated. That is, decomposition may be performed into the thicknesses of arbitrary two kinds of materials. In addition, an image of an effective atomic number Z and an image of a surface density D may be obtained from the attenuation rate image L at low energy and the attenuation rate image H at high energy, which are obtained by the correction shown in FIG. 5. The effective atomic number Z is an equivalent atomic number of a mixture, and the surface density D is the product of the density [g/cm³] of an object and the thickness [cm] of the object.

Also, in the first embodiment, the nonlinear simultaneous equations are solved using the Newton-Raphson method. However, the disclosed technique is not limited to this. For example, an iterative method such as a least square method or a bisection method may be used. Furthermore, in the first embodiment, the nonlinear simultaneous equations are solved using the iterative method but the disclosed technique is not limited to this. A configuration for generating a table by obtaining, in advance, the bone thicknesses B and the soft tissue thicknesses S for various combinations of the attenuation rates H at high energy and the attenuation rates L at low energy, and obtaining the bone thickness B and the soft tissue thickness S at high speed by referring to this table may be used.

FIG. 7 is a block diagram of image processing of energy subtraction processing according to the first embodiment. The image processing unit 134 according to the first embodiment generates a display image by, for example, performing post-processing for the bone thickness image B obtained by the signal processing shown in FIG. 6. As the post-processing, the image processing unit 134 can use logarithmic transformation, dynamic range compression, or the like. By inputting the type or intensity of post-processing as a parameter, the image processing unit 134 can switch the contents of processing.

FIG. 8 is a block diagram of correction processing according to the first embodiment. As the display image in FIG. 7, an accumulation image A that is an image not having an energy resolution, that is, an image compatible with an image captured by an existing radiation imaging system can be used. The signal processing unit 133 can generate the accumulation image A by the following processing. For example, the accumulation image A can be generated by, for example, dividing the image XF_EVEN corresponding to the sum of X-rays during the rising period 301, the stable period 302, and the falling period 303 when there is an object by the image WF_EVEN corresponding to the sum of X-rays during the rising period 301, the stable period 302, and the falling period 303 when there is no object, as shown in FIG. 8. Alternatively, the accumulation image A may be obtained based on the addition of the plurality of images corresponding to the plurality of different radiation energies. For example, the accumulation image A may be generated by multiplying the attenuation rate image H at high energy and the attenuation rate image L at low energy by coefficients and adding these. For example, when calculating the accumulation image A, one coefficient may be set to 0, and the other may be set to 1. The image H or the image L itself can be used as the accumulation image A. The accumulation image may be generated by multiplying at least one of the plurality of images by a coefficient and adding these. An image whose imaging timing is substantially the same as the image of the target of energy subtraction processing and to which the energy subtraction processing is not applied can be used as the accumulation image A.

$$A = \text{XF\_EVEN/WF\_EVEN} \qquad (10)$$

$$= \text{X\_High/WF\_EVEN} + \text{X\_Low/WF\_EVEN}$$

$$= H * (\text{W\_High/WF\_EVEN}) + L * (\text{W\_Low/WF\_EVEN})$$

Figure 9:
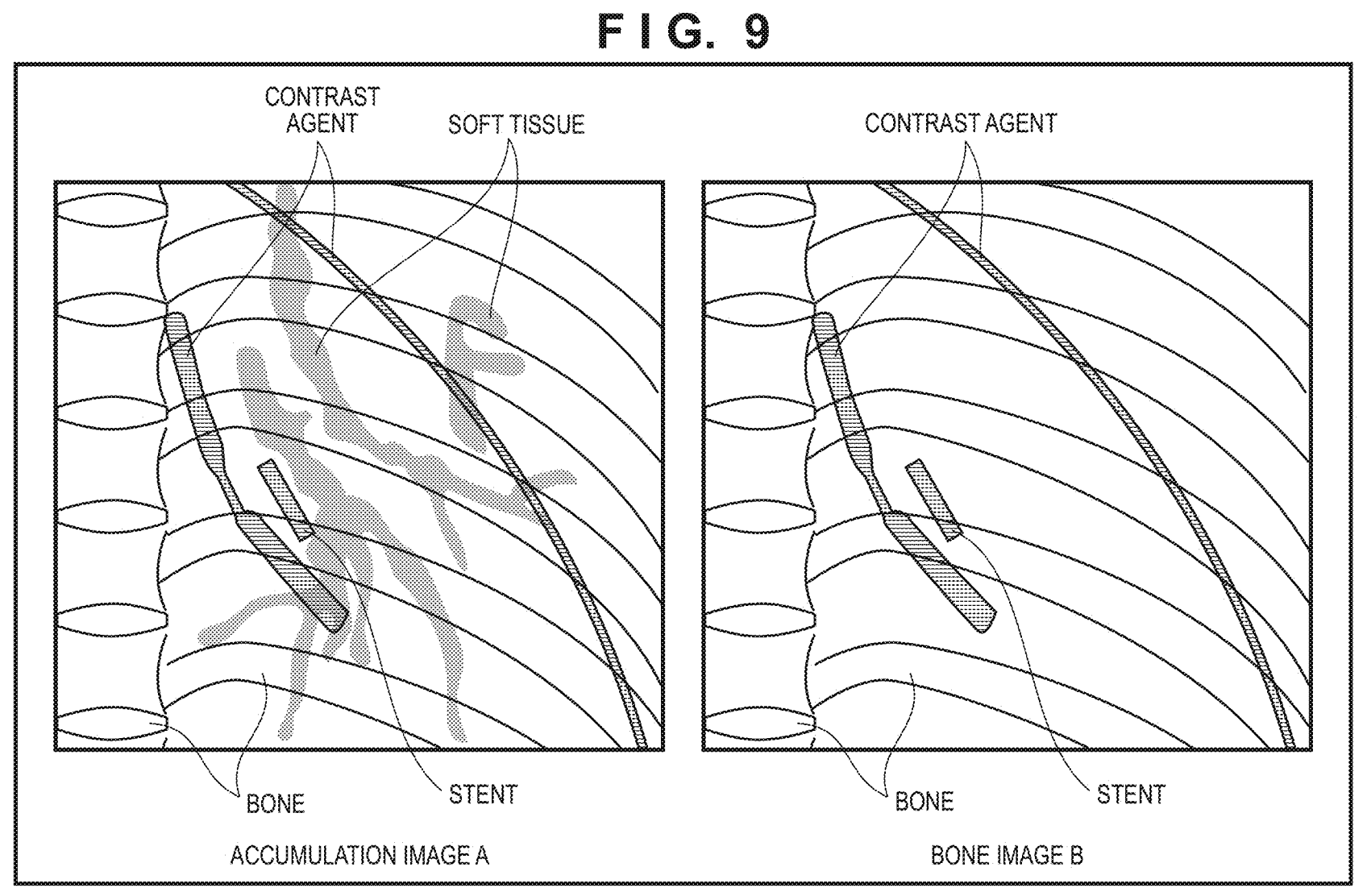

FIG. 9 is a view exemplarily showing the accumulation image A and the bone image B according to the first embodiment. A normal huma body is formed only by soft tissues and bones. However, when performing Interventional Radiology (IVR) using the radiation imaging system shown in FIG. 1, a contrast agent is injected into blood vessels. Also, a treatment of inserting a catheter or a guide wire into the blood vessels and indwelling a stent or a coil is performed. IVR is conducted while confirming the positions and shapes of the contrast agent and the medical device. Hence, when only the contrast agent or the medical device is decomposed, or a background such as a soft tissue or a bone is removed, the visibility may be improved.

As shown in FIG. 9, in the image compatible with the normal radiation imaging system, that is, the accumulation image A, soft tissues are displayed in addition to the contrast agent, the stent, and the bones. On the other hand, in the bone image B in the radiation imaging system according to the first embodiment, the contrast of the soft tissues can be reduced.

On the other hand, the main component of the contrast agent is iodine, and the main component of the medical device is a metal such as stainless. Since both have atomic numbers larger than calcium that is the main component of bones, the bones, the contrast agent, and the medical device are displayed in the bone image B.

When the present inventors made examinations and, for example, decomposed an image into a water image W and a contrast agent image I based on the high energy image H and the low energy image L, the bones, the contrast agent, and the medical device were displayed in the contrast agent image I. This also applies even if the tube voltage or filter is changed between the X-rays of low energy and the X-rays of high energy. In any case, the bones, the contrast agent, and the medical device are displayed in the bone image B. That is, the contrast agent and the medical device could not be decomposed from the bone image B.

That is, if the contrast of soft tissues lowers the visibility as in a lung field at the time of IVR of the chest, the visibility of the contrast agent or the medical device may be improved by displaying the bone image B in the radiation imaging system according to this embodiment. However, there may be a problem that noise in the bone image B becomes larger than in the accumulation image A to lower image quality. Hence, in the radiation imaging system according to this embodiment, noise reduction processing in the bone image B is performed.

Figure 10:
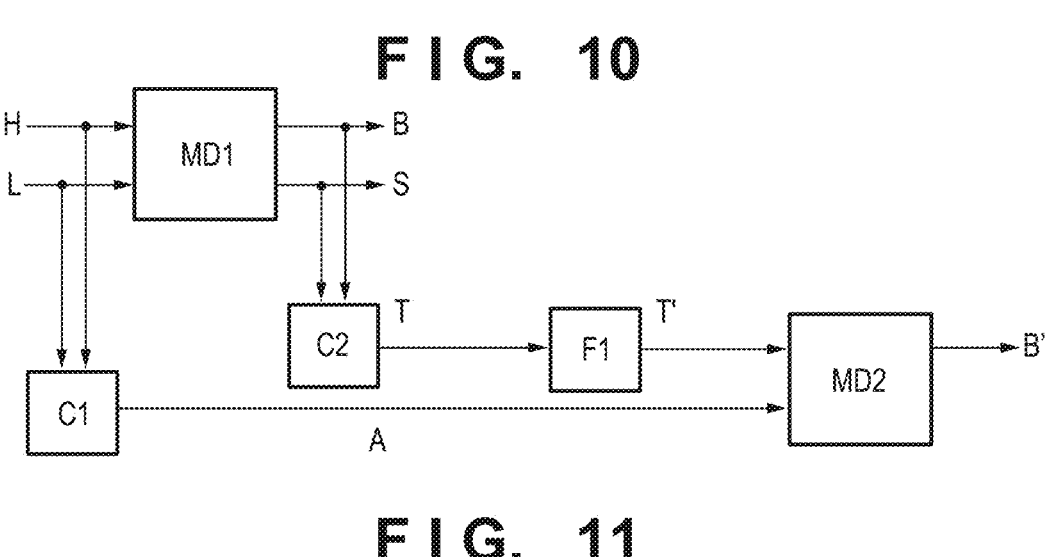
FIG. 10 is a block diagram of signal processing in a radiation imaging system according to the first embodiment.

FIG. 10 is a block diagram of signal processing in the radiation imaging system according to the first embodiment. First, the signal processing unit 133 performs material decomposition processing in a block MD1. Here, the material decomposition processing is processing of obtaining (generating), by the signal processing unit 133, the bone image B and the soft tissue image S from the high energy image H and the low energy image L in accordance with the same procedure as in FIG. 6.

In a block C2, the signal processing unit 133 generates a thickness image T by adding the bone image B and the soft tissue image S. In a block F1, the signal processing unit 133 performs filter processing for the thickness image T, thereby generating a thickness image T' with reduced noise. Details of filter processing will be described with reference to FIG. 11 and thereafter.

Also, in a block C1, the signal processing unit 133, for example, multiplies the attenuation rate image H at high energy and the attenuation rate image L at low energy by coefficients and adds these, as described with reference to FIG. 8, thereby generating the accumulation image A.

Next, in a block MD2, the signal processing unit 133 performs material decomposition processing again. The material decomposition processing performed again in the block MD2 will also be referred to as re-decomposition (or re-decomposition processing) hereinafter. Here, re-decomposition processing is processing of, for example, obtaining (generating) a bone image B' with reduced noise, by the signal processing unit 133, from the thickness image T' after filter processing and the accumulation image A.

When $N_A(E)$ represents the X-ray spectrum in the image of the sum of the X-rays of low energy and the X-rays of high energy, that is, the accumulation image A, S represents the thickness of the soft tissue, and B represents the thickness of the bone, equation (11) holds.

$$A = \frac{\int N_A(E)\exp\{-\mu_B(E)B - \mu_S(E)S\}EdE}{\int N_A(E)EdE} \qquad (11)$$

Here, letting T be the thickness, since T=B+S, equation (11) can be rewritten to $$A = \frac{\int N_A(E)\exp\{-\mu_B(E)B - \mu_S(E)(T-B)\}EdE}{\int N_A(E)EdE} \qquad (12)$$

When the nonlinear simultaneous equations are solved by substituting the pixel value A of the accumulation image and the thickness T in a given pixel into equation (12), the bone thickness B in the pixel can be obtained. At this time, if equation (12) is solved by substituting the thickness T' after filter processing in place of the thickness T, the bone thickness B can be obtained. Since the thickness image T has a higher continuity as compared to the accumulation image A, no high frequency component is included. Hence, even if noise is removed by performing filter processing, signal components are hardly lost. When the thickness image T' with reduced noise and the accumulation image A that originally includes little noise are used, the bone image B' with reduced noise can be obtained. Similarly, a soft tissue image S' with reduced noise can also be obtained.

In this embodiment, a configuration has been described in which in the block diagram of signal processing shown in FIG. 10, the thickness image T is input to the block F1, and the bone image B' with reduced noise or the soft tissue image S' with reduced noise is obtained from the block MD2. However, this embodiment is not limited to this example, and can also similarly be applied to a configuration in which, for example, the soft tissue image S is input to the block F1, and the bone image B' with reduced noise or the thickness image T' with reduced noise is obtained from the block MD2. This embodiment can also similarly be applied to a configuration in which the bone image B is input to the block F1, and the soft tissue image S' with reduced noise or the thickness image T' with reduced noise is obtained from the block MD2.

That is, in this embodiment, the thickness image of a material is input to the block F1, and the thickness image of the material after noise reduction is obtained from the block MD2.

Also, in this embodiment, in the block diagram of signal processing shown in FIG. 10, a configuration in which the low energy image L and the high energy image H are input to the block MD1 and the block C1 has been described. However, the embodiment is not limited to this example and can also similarly be applied to a configuration in which, for example, noise reduction processing is performed for the low energy image L and the high energy image H to generate a low energy image L' after noise reduction and a high energy image H' after noise reduction, and these are input to the block MD1 and the block C1.

Also, filter processing in the block F1 includes spatial filter processing using a filter in the spatial direction and time filter processing using a filter in the time direction. In the spatial filter processing, for example, a filter in the spatial direction such as a Gaussian filter, a bilateral filter, or an Epsilon filter can be used. In the time filter processing, for example, a recursive filter can be used. Note that the filters usable in the filter processing are merely examples, and the configuration of this embodiment is not limited to these examples.

Figure 11:
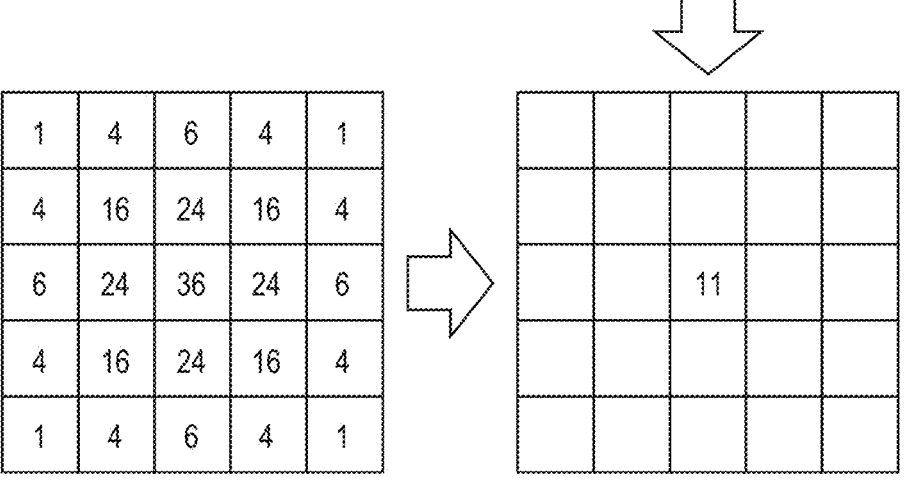
FIG. 11 is a view for explaining noise reduction processing by a Gaussian filter.

FIG. 11 is a view for exemplarily explaining noise reduction processing by a Gaussian filter according to the first embodiment. In the block F1 in the block diagram of signal processing shown in FIG. 10, the signal processing unit 133 calculates a weight according to the distance from the center of the filter using a Gaussian distribution function, thereby generating the kernel of a Gaussian filter. Also, the signal processing unit 133 performs normalization such that when all weights of the kernel of the Gaussian filter are added, 1 is obtained. The signal processing unit 133 applies the kernel of the Gaussian filter to the thickness image T, thereby generating the thickness image T' after noise reduction. In this way, a high frequency noise component contained in the thickness image T can be removed. However, when the Gaussian filter is used in the block F1, the structure of the object may also be reduced (removed) together with the noise component. As a result, when the bone image B' after noise reduction is generated by material decomposition (re-decomposition) in the block MD2, the structure of the soft tissue S may appear in the bone image B'.

FIG. 12 is a view for exemplarily explaining noise reduction processing by an Epsilon filter according to the first embodiment. In the block F1 in the block diagram of signal processing shown in FIG. 10, the signal processing unit 133 calculates a weight according to the distance from the center using a Gaussian distribution function, thereby generating the kernel of a Gaussian filter. Also, the signal processing unit 133 selects a pixel (pixel of interest) to apply the filter, and calculates a difference d between the pixel of interest and a peripheral pixel in the thickness image T. If the difference d exceeds a predetermined threshold 6, the signal processing unit 133 determines that there is the structure of the object, and sets the weight of the kernel of edge determination to 0. If the difference d is less than the predetermined threshold 6, the signal processing unit 133 determines that there is not the structure of the object, and sets the weight of the kernel of edge determination to 1.

Next, the signal processing unit 133 multiplies the kernel of the Gaussian filter and the kernel of the edge determination for each element of the filter, thereby generating the kernel of an Epsilon filter. Also, the signal processing unit 133 performs normalization such that when all weights of the kernel of the Epsilon filter are added, 1 is obtained. The signal processing unit 133 applies the kernel of the Epsilon filter to the thickness image T, thereby generating the thickness image T' after noise reduction. In this way, the high frequency noise component included in the thickness image T can be reduced (removed) without reducing (removing) the structure of the object. This can suppress appearance of the structure of the soft tissue in the bone image B' after noise reduction.

FIG. 13 is a view for exemplarily explaining edge determination processing by the accumulation image A according to the first embodiment. The present inventors made examinations and found that in the configuration of the block F1 shown in FIG. 12, for example, if noise included in the thickness image T becomes large, the accuracy of edge determination lowers, and an artifact may occur. Hence, a configuration in which edge determination is performed using the accumulation image A in place of the thickness image T will be described below.

In the block F1 in the block diagram of signal processing shown in FIG. 10, the signal processing unit 133 calculates a weight according to the distance from the center using a Gaussian distribution function, thereby generating the kernel of a Gaussian filter. Also, the signal processing unit 133 selects a pixel (pixel of interest) to apply the filter, and calculates the difference d between the pixel of interest and a peripheral pixel in the accumulation image A. If the difference d exceeds the predetermined threshold 6, the signal processing unit 133 determines that there is the structure of the object, and sets the weight of the kernel of edge determination to 0. If the difference d is less than the predetermined threshold ε, the signal processing unit 133 determines that there is not the structure of the object, and sets the weight of the kernel of edge determination to 1.

Next, the signal processing unit 133 multiplies the kernel of the Gaussian filter and the kernel of the edge determination for each element of the filter, thereby generating the kernel of an Epsilon filter. Also, the signal processing unit 133 performs normalization such that when all weights of the kernel of the Epsilon filter are added, 1 is obtained. The signal processing unit 133 applies the kernel of the Epsilon filter generated using the accumulation image A to the thickness image T, thereby generating the thickness image T' after noise reduction. Since noise in the accumulation image A is smaller as compared to the thickness image T, for example, even if noise included in the thickness image T becomes large, the accuracy of edge determination can be maintained. As a result, occurrence of an artifact can be suppressed.

When the standard deviation of noise that can be included in a pixel value of the accumulation image A is represented by $\sigma$, the threshold $\varepsilon$ of edge determination preferably satisfies, for example, $\varepsilon > 4\sigma$. If the noise that can be included in the pixel value complies with the Gaussian distribution, the probability that a value of $4\sigma$ or more is obtained due to noise is very low, 1/15787.

The noise that can be included in the pixel value can include, for example, an electrical noise (system noise) component and a quantum noise component. If system noise is dominant, the standard deviation $\sigma$ of noise can be a constant value without depending on the pixel value. Hence, a configuration using a constant value as the threshold $\varepsilon$ is suitable used. On the other hand, if quantum noise is dominant, the standard deviation $\sigma$ of noise can be a value proportional to the square root of the pixel value. Hence, a configuration using a value proportional to the square root of the pixel value as the threshold $\varepsilon$ is suitable used. According to the configuration of this embodiment, it is possible to obtain a material decomposition image with reduced noise.

Second Embodiment

In the second embodiment, a configuration that removes an artifact such as low frequency noise or pseudo contour included in an image B' after noise reduction will be described. In the second embodiment, a block diagram of signal processing described with reference to FIG. 10, and the like is the same as in the first embodiment, but the contents of filter processing in a block F1 are different.

FIG. 14 is a view for exemplarily explaining noise reduction processing by frequency resolution according to the second embodiment. The present inventors made examinations and found that in the configuration of the block F1 shown in FIG. 13, low frequency noise may be generated in an image T' after noise reduction. The low frequency noise is unnoticeable in, for example, a still image but may reduce visibility in a moving image. In this embodiment, a configuration that reduces low frequency noise by frequency resolution will be described.

The block F1 of signal processing shown in FIG. 14 is formed by subblocks P[1] to P[n].

First, a thickness image T[1] is input to the subblock P[1], and a signal processing unit 133 down-samples the thickness image T[1] by a decimation filter FD[1], thereby generating a thickness image T[2] with a reduced resolution. Also, the thickness image T[2] is input to the subblock P[2], and the signal processing unit 133 down-samples the thickness image T[2] by a decimation filter FD[2], thereby generating a thickness image T[3] with a reduced resolution. By repeating this processing up to the subblock P[n], the signal processing unit 133 generates the frequency-resolved thickness images T[1] to T[n+1].

Also, in the subblock P[1], the signal processing unit 133 up-samples the thickness image T[2] by an interpolation filter FI[1], thereby generating a thickness image I[1] after restoration, for which the resolved frequency component (resolution) is restored. In addition, the signal processing unit 133 reduces noise of the thickness image T[1] by an Epsilon filter FE[1], thereby generating a thickness image E[1] after noise reduction. As the Epsilon filter FE[1], for example, the Epsilon filter described with reference to FIG. 12 can be used. Furthermore, the signal processing unit 133 subtracts the thickness image I[1] after restoration from the thickness image E[1] after noise reduction, thereby generating a Laplacian image D[1]. By repeating the same processing as the above-described processing in the subblock P[1] for the subblocks P[2] to P[n], the signal processing unit 133 generates frequency-resolved Laplacian images D[1] to D[n].

After that, in the subblock P[n], the signal processing unit 133 up-samples a frequency-combined image S[n+1] by an interpolation filter FC[n], thereby generating a frequency-restored image C[n] after restoration. In addition, the signal processing unit 133 adds the frequency-restored image C[n] after restoration to the Laplacian image D[n], thereby generating a frequency-combined image S[n]. By repeating the same processing as the above-described processing in the subblock P[n] for subblocks P[n−1] to P[1], the signal processing unit 133 generates frequency-combined images S[n] to S[1].

Note that in FIG. 14, as the frequency-combined image S[n+1] in the subblock P[n], a frequency-resolved thickness image T[n+1] is input. In addition, as the frequency-resolved thickness image T[1] in the subblock P[1], the thickness image T is input, and as the thickness image T' after noise reduction, the frequency-combined image S[1] is output.

With the above-described configuration, the signal processing unit 133 performs frequency resolution for the input thickness image T, performs noise reduction processing using the Epsilon filters (FE[1] to FE[n]) for each frequency, and then generates a frequency-combined image by combining all frequency-resolved frequencies. As a result, it is possible to obtain a thickness image T' (frequency-combined image S[1]) in which high frequency noise to low frequency noise included in the thickness image T are reduced.

Figure 15:
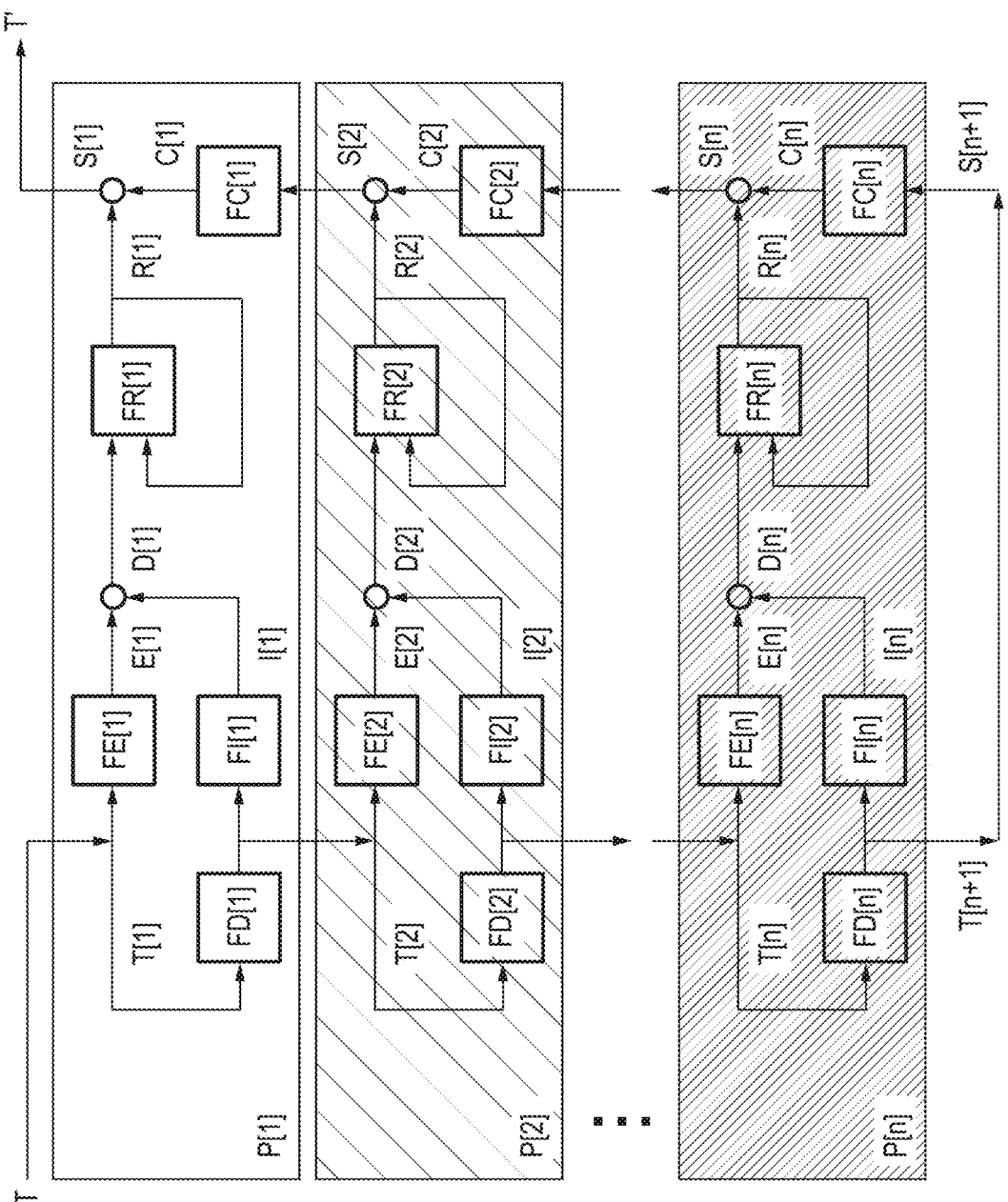
FIG. 15 is a view for exemplarily explaining noise reduction processing by frequency resolution and a recursive filter according to the second embodiment.

FIG. 15 is a view for exemplarily explaining noise reduction processing by frequency resolution and a recursive filter according to the second embodiment. The present inventors made examinations and found that in the configuration of the block F1 shown in FIG. 14, for example, in a portion of the image T' after noise reduction, where the thickness of the object abruptly changes, a pattern like growth rings may be generated. Such an artifact is called a pseudo contour. The pseudo contour is unnoticeable in, for example, a still image but may reduce visibility in a moving image. In this embodiment, a configuration that reduces a pseudo contour together with the low-frequency noise by frequency resolution and a recursive filter will be described.

The block F1 of signal processing shown in FIG. 15 is formed by the subblocks P[1] to P[n], as in FIG. 14. The portion where the frequency-resolved thickness images T[1] to T[n+1] are generated, and after that, the frequency-resolved Laplacian images D[1] to D[n] are generated is the same as the signal processing shown in FIG. 14.

In the signal processing block F1 shown in FIG. 15, in the subblock P[1], the signal processing unit 133 inputs a Laplacian image D[1][t] of the tth frame (t is an integer of 1 or more) and a Laplacian image R[1][t−1] of the (t−1)th frame after recursive filter processing to a recursive filter FR[1], thereby obtaining a Laplacian image R[1] of the tth frame after recursive filter processing.

By repeating the same processing as the above-described processing in the subblock P[1] for the subblocks P[2] to P[n], the signal processing unit 133 generates Laplacian images R[1] to R[n] after recursive filter processing (after time filter processing).

After that, in the subblock P[n], the signal processing unit 133 up-samples the frequency-combined image S[n+1] by the interpolation filter FC[n], thereby generating the frequency-restored image C[n] after restoration. In addition, the signal processing unit 133 adds the frequency-restored image C[n] after restoration to the Laplacian image R[n] after recursive filter processing, thereby generating the frequency-combined image S[n]. By repeating the same processing as the above-described processing in the subblock P[n] for the subblocks P[n−1] to P[1], the signal processing unit 133 generates the frequency-combined images S[n] to S[1].

Note that in FIG. 15 as well, as the frequency-combined image S[n+1] in the subblock P[n], the frequency-resolved thickness image T[n+1] is input, as in FIG. 14. In addition, as the frequency-resolved thickness image T[1] in the subblock P[1], the thickness image T is input, and as the thickness image T' after noise reduction, the frequency-combined image S[1] is output.

With the above-described configuration, the signal processing unit 133 performs frequency resolution for the input thickness image T, performs noise reduction processing using the Epsilon filters (FE[1] to FE[n]) for each frequency, performs pseudo contour reduction processing by the recursive filters (FR[1] to FR[n]), and then generates a frequency-combined image by combining all frequency-resolved frequencies. As a result, it is possible to obtain the thickness image T' (frequency-combined image S[1]) in which high frequency noise to low frequency noise included in the thickness image T are reduced, and the pseudo contour is also reduced. The signal processing unit 133 generates an image by material re-decomposition processing using the thickness image T' after noise reduction and an accumulation image A. According to the configuration of this embodiment, it is possible to obtain a material decomposition image with reduced noise.

Third Embodiment

In the third embodiment, a configuration in which edge determination using an accumulation image A is applied in noise reduction processing using an Epsilon filter in the second embodiment will be described. In the third embodiment, a block diagram of signal processing described with reference to FIG. 10, and the like is the same as in the first embodiment. Also, the configuration of the block diagram of frequency resolution and recursive filters in FIG. 15 is the same as in the second embodiment, but the configurations of Epsilon filters FE[1] to FE[n] are different.

Figure 16:
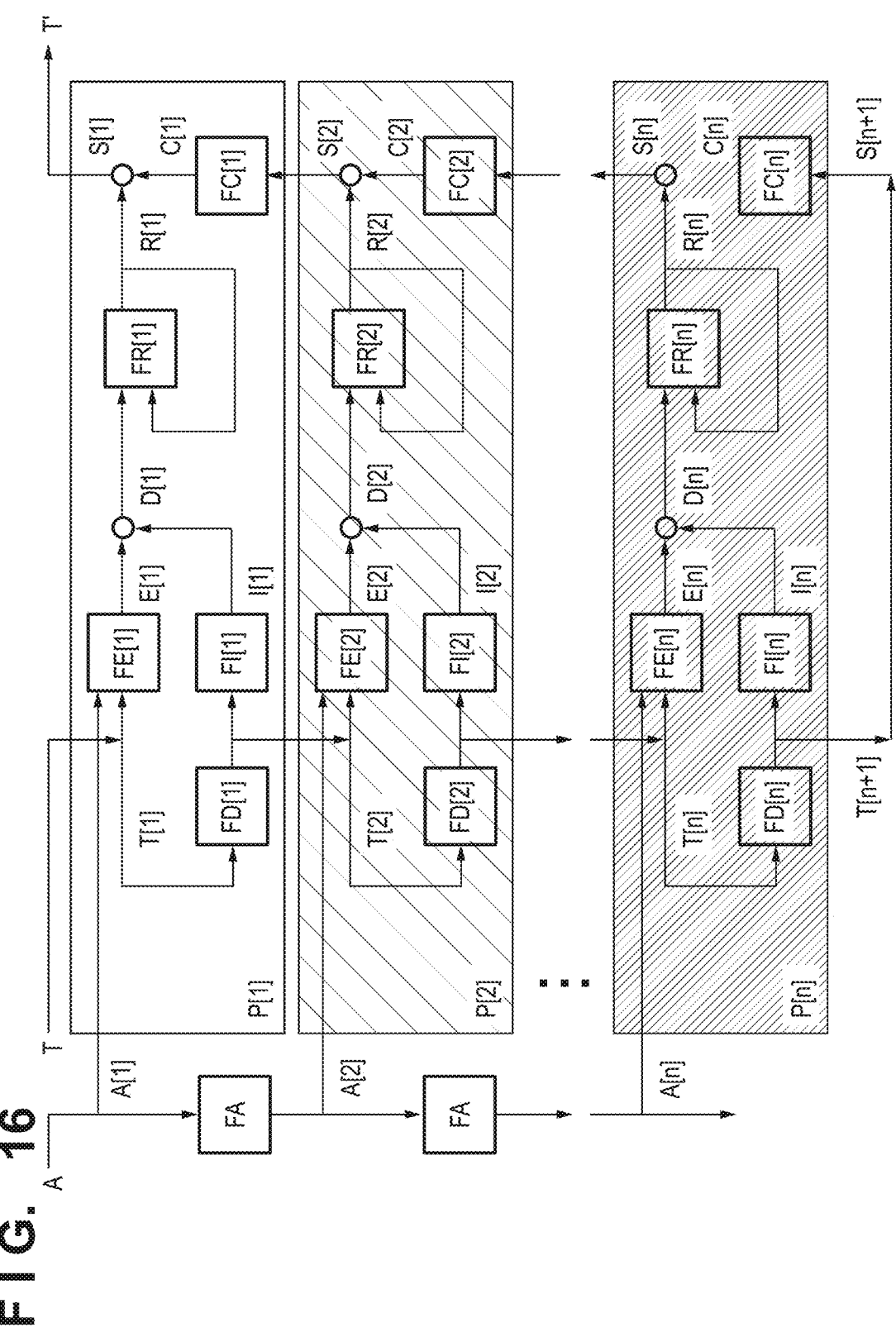
FIG. 16 is a view for explaining an example of a configuration in which edge determination using an accumulation image is applied in noise reduction processing using an Epsilon filter according to a third embodiment.

FIG. 16 is a view for explaining an example of a configuration in which edge determination using the accumulation image A is applied in noise reduction processing using an Epsilon filter according to the third embodiment. In FIG. 15, as the Epsilon filter FE, for example, a filter configured to use a thickness image T, as described above with reference to FIG. 12 is used. However, as described with reference to FIG. 13, the configuration in which edge determination processing using the accumulation image A is performed may be preferable.

In this embodiment, a signal processing unit 133 generates a thickness image after noise reduction by filter processing using a filter for which a coefficient is set based on a pixel value of the accumulation image A obtained based on addition of a plurality of images to the thickness image of a material obtained by material decomposition processing. The signal processing unit 133 down-samples an accumulation image A[1] by a decimation filter FA[1], thereby generating an accumulation image A[2] whose resolution is lowered by frequency resolution. Also, the signal processing unit 133 down-samples the accumulation image A[2] by a decimation filter FA[2], thereby generating an accumulation image A[3] whose resolution is lowered by frequency resolution. By repeating this, the signal processing unit 133 generates the frequency-resolved accumulation images A[1] to A[n]. Note that in FIG. 16, as the frequency-resolved accumulation image A[1], the accumulation image A is input.

In the subblock P[1], the signal processing unit 133 inputs the frequency-resolved accumulation image A[1] and a frequency-resolved thickness image T[1] to the Epsilon filter FE[1], thereby generating a thickness image E[1] after noise reduction. As the Epsilon filter FE[1] in the third embodiment, an Epsilon filter generated by performing edge determination using an accumulation image, which is shown in FIG. 13, is used. By repeating the same processing as the above-described processing in the subblock P[1] for the subblocks P[2] to P[n], the signal processing unit 133 generates thickness images E[1] to E[n] after noise reduction. The rest of the processing is the same as in the second embodiment described above.

With the above-described configuration, the signal processing unit 133 performs frequency resolution for the input thickness image T, performs noise reduction processing using the Epsilon filters for each frequency, performs pseudo contour reduction processing by the recursive filters, and then generates a frequency-combined image by combining all frequency-resolved frequencies. When the accumulation image A is frequency-resolved and input to the Epsilon filter, the accuracy of edge determination rises, and the thickness image T' with less artifact can be obtained. The signal processing unit 133 generates an image by material re-decomposition processing using the thickness image T' after noise reduction and the accumulation image A. According to the configuration of this embodiment, it is possible to obtain a material decomposition image with reduced noise.

Note that in the first to third embodiments, the X-ray imaging apparatus 104 is an indirect type X-ray sensor using a phosphor. However, the disclosed technique is not limited to this form. For example, a direct type X-ray sensor using a direct conversion material such as CdTe may be used.

Also, in the first to third embodiments, the tube voltage of the X-ray generation apparatus 101 is changed. However, the disclosed technique is not limited to this form. The energy of X-rays applied to the X-ray imaging apparatus 104 may be changed by temporally switching the filter of the X-ray generation apparatus 101.

Also, in the first to third embodiments, the X-ray energy is changed, thereby obtaining an image of a different energy. However, the disclosed technique is not limited to this form. A plurality of phosphors 105 and a plurality of two-dimensional detectors 106 may be overlaid, and images of different energies may be obtained from the two-dimensional detector on the front side and the two-dimensional detector on the rear side with respect to the direction of incidence of X-rays. The two-dimensional detector 106 is not limited to a medical device, and an industrial two-dimensional detector may be used.

Also, in the first to third embodiments, energy subtraction processing is performed using the imaging control apparatus 103 of the radiation imaging system. However, the disclosed technique is not limited to this form. An image obtained by the imaging control apparatus 103 may be transferred to another computer, and energy subtraction processing may be performed. For example, a configuration in which an obtained image is transferred to another personal computer (image viewer) via a medical PACS, and displayed after energy subtraction processing is performed is suitably used.

According to the disclosed technique, it is possible to obtain an image with reduced noise.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-095223, filed Jun. 13, 2022 which is hereby incorporated by reference herein in its entirety.

What is claimed is:

1. An image processing apparatus comprising:
a processor; and
a memory, including instructions stored thereon, which when executed by the processor cause the apparatus to:
perform noise reduction processing and material decomposition processing using a plurality of images corresponding to a plurality of different radiation energies obtained by irradiating an object with radiation and performing imaging;
generate a noise reduction image by applying filter processing for each frequency component obtained by resolving a thickness image of a material obtained by the material decomposition processing into a plurality of frequencies;
generate an image by material re-decomposition processing using the thickness image after noise reduction, which is obtained by combining the noise reduction images for each frequency component and an accumulation image obtained based on combining of the plurality of images,
wherein the filter processing includes spatial filter processing applied for each frequency component and time filter processing applied for each frequency component after the spatial filter processing, and
wherein the time filter processing is performed for an image generated by subtracting a thickness image with restored frequency component from the noise reduction image to which the spatial filter processing is applied.

2. The apparatus according to claim 1, wherein the instructions, when executed by the processor, further cause the apparatus to:
perform the spatial filter processing using one of an Epsilon filter and a bilateral filter.

3. The apparatus according to claim 2, wherein the instructions, when executed by the processor, further cause the apparatus to:
perform the time filter processing using a recursive filter.

4. The apparatus according to claim 1, wherein the instructions, when executed by the processor, further cause the apparatus to: set a coefficient of a filter applied to the filter processing using the accumulation image resolved into the frequency components.

5. The apparatus according to claim 4, wherein the instructions, when executed by the processor, further cause the apparatus to:
set a weight of edge determination of a structure of the object depending on whether a difference between a pixel of interest in the accumulation image and a peripheral pixel exceeds a threshold, and
set the coefficient of the filter based on the weight of the edge determination.

6. The apparatus according to claim 5, wherein the instructions, when executed by the processor, further cause the apparatus to: set the weight of the edge determination using one of a threshold independently of the pixel value in the accumulation image and a threshold proportional to a square root of the pixel value in the accumulation image.

7. The apparatus according to claim 1, wherein the instructions, when executed by the processor, further cause the apparatus to: generate the thickness image after the noise reduction by combining, for each of the resolved frequency components, a frequency-combined image obtained by combining the image after the time filter processing and a frequency-restored image with the restored frequency component in the thickness image.

8. The apparatus according to claim 1, wherein the instructions, when executed by the processor, further cause the apparatus to:

obtain the plurality of images after noise reduction by applying the filter processing to the plurality of images corresponding to the plurality of different radiation energies;

generate the noise reduction image by applying the filter processing for each of the frequency components obtained by resolving, into a plurality of frequencies, the thickness image of the material obtained by the material decomposition processing using the plurality of images after noise reduction; and generate an image in which the material included in the object is decomposed by the material decomposition processing using the thickness image after noise reduction with which the noise reduction image is combined and the accumulation image obtained based on combining of the plurality of images.

9. The apparatus according to claim 1, wherein the instructions, when executed by the processor, further cause the apparatus to: generate the accumulation image by multiplying at least one of the plurality of images by a coefficient and combining the images.

10. The apparatus according to claim 1, wherein the instructions, when executed by the processor, further cause the apparatus to:

obtain the thickness image by a sum of a thickness image of a first material obtained by the material decomposition processing and a thickness image of a second material different from the first material, and generate the thickness image of the first material as the image by the material re-decomposition processing.

11. The apparatus according to claim 10, wherein the thickness image of the first material is a bone image, and the thickness image of the second material is a soft tissue image.

12. The apparatus according to claim 1, wherein the instructions, when executed by the processor, further cause the apparatus to:

obtain a thickness image of a first material obtained by the material decomposition processing and a thickness image of a second material different from the first material, input, as the thickness image, the thickness image of the second material, and generate, as the image by the material re-decomposition processing, a thickness image with reduced noise by a sum of the thickness image of the first material and the thickness image of the second material.

13. The apparatus according to claim 1, wherein the plurality of radiation energies include a first radiation energy and a second radiation energy lower than the first radiation energy, and wherein the instructions, when executed by the processor, further cause the apparatus to:

perform the material decomposition processing for generating a first material decomposition image representing a thickness of a first material included in the object and a second material decomposition image representing a thickness of a second material different from the first material using a first image captured using the first radiation energy and a second image captured using the second radiation energy.

14. A radiation imaging system comprising:

an image processing apparatus defined in claim 1; and a radiation imaging apparatus communicably connected to the image processing apparatus.

15. An image processing method comprising:

performing noise reduction processing and material decomposition processing using a plurality of images corresponding to a plurality of different radiation energies obtained by irradiating an object with radiation and performing imaging, wherein in the performing, a noise reduction image is generated by applying filter processing for each frequency component obtained by resolving a thickness image of a material obtained by the material decomposition processing into a plurality of frequencies, an image by material re-decomposition processing is generated using the thickness image after noise reduction, which is obtained by combining the noise reduction images for each frequency component and an accumulation image obtained based on combining of the plurality of images, wherein the filter processing includes spatial filter processing applied for each frequency component and time filter processing applied for each frequency component after the spatial filter processing, and wherein the time filter processing is performed for an image generated by subtracting a thickness image with restored frequency component from the noise reduction image to which the spatial filter processing is applied.

16. A non-transitory computer-readable storage medium storing a program for causing a computer to execute the method according to claim 15.

* * * * *